(12) United States Patent
Liu et al.

(10) Patent No.: US 11,064,134 B2
(45) Date of Patent: Jul. 13, 2021

(54) HIGH-DYNAMIC RANGE IMAGE SENSOR AND IMAGE-CAPTURE METHOD

(71) Applicant: OmniVision Technologies, Inc., Santa Clara, CA (US)

(72) Inventors: Chengming Liu, Fremont, CA (US); Tiejun Dai, Santa Clara, CA (US); Richard Mann, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/558,499

(22) Filed: Sep. 3, 2019

(65) Prior Publication Data

US 2020/0389586 A1 Dec. 10, 2020

Related U.S. Application Data

(63) Continuation-in-part of application No. 16/431,887, filed on Jun. 5, 2019.

(51) Int. Cl.
*H04N 5/235* (2006.01)
*H04N 9/04* (2006.01)

(52) U.S. Cl.
CPC ......... *H04N 5/2355* (2013.01); *H04N 5/2353* (2013.01); *H04N 9/0455* (2018.08)

(58) Field of Classification Search
CPC ... H04N 5/2355; H04N 9/0455; H04N 5/2353
See application file for complete search history.

(56) References Cited

U.S. PATENT DOCUMENTS

| | | |
|---|---|---|
| 2008/0165264 A1 | 7/2008 | Saito et al. |
| 2010/0141792 A1 | 6/2010 | Arai |
| 2012/0219235 A1 | 8/2012 | Solhusvik et al. |
| 2014/0063300 A1 | 3/2014 | Lin et al. |
| 2015/0244916 A1 | 8/2015 | Kang et al. |
| 2015/0256734 A1* | 9/2015 | Fukuhara ............. H04N 5/2355 348/294 |

(Continued)

OTHER PUBLICATIONS

U.S. Appl. No. 16/431,887 Final Office Action dated Jan. 12, 2021, 9 pages.

(Continued)

*Primary Examiner* — Gevell V Selby
(74) *Attorney, Agent, or Firm* — Lathrop GPM LLP

(57) ABSTRACT

An image sensor includes a pixel array, and a first, second, and an intermediate memory-element. The memory-elements store, respectively, a first, second, and an intermediate exposure value. The pixel array includes pixel-subarrays each including a rescue pixel and a first, second, and third plurality of contiguous pixels. Each of the first plurality of pixels is connected to the first memory-element and spans diagonally-opposite corners of the pixel-subarray. Each of the second plurality of pixels is connected to the second memory-element and located on a first side of the first plurality of pixels. Each of the third plurality of pixels is connected to the second memory-element and located on a second side of the first plurality of pixels. The rescue-pixel is connected to the intermediate memory-element and is (i) located on one of the first side and the second side and/or (ii) adjacent to one of the first plurality of pixels.

18 Claims, 15 Drawing Sheets

(56) References Cited

U.S. PATENT DOCUMENTS

2015/0256736 A1* 9/2015 Fukuhara ........... H04N 5/23212
　　　　　　　　　　　　　　　　　　　　　348/349
2019/0342511 A1* 11/2019 Zhao .................. H04N 5/23229
2020/0236273 A1* 7/2020 Kang ................... H04N 5/2353

OTHER PUBLICATIONS

U.S. Appl. No. 16/431,887 Office Action dated Oct. 6, 2020, 5 pages.
U.S. Appl. No. 16/431,887 Office Action dated Jul. 10, 2020, 4 pages.

* cited by examiner

HIGH-DYNAMIC RANGE IMAGE SENSOR AND IMAGE-CAPTURE METHOD

CROSS-REFERENCE TO RELATED APPLICATIONS

This application is a continuation-in-part of U.S. patent application Ser. No. 16/431,887, filed on Jun. 5, 2019, the disclosure of which is incorporated herein by reference in its entirety.

BACKGROUND

Many consumer electronics products are equipped with at least one camera. These products include tablet computers, mobile phones, and smart watches. Such products, and digital still cameras themselves, may implement high-dynamic range (HDR) functionality to enable imaging of scenes having a large dynamic range of luminosity. The cameras include an image sensor having many pixels arranged as a pixel array. One way to capture an HDR image is for the image sensor to have spatially-varying exposure settings across the pixel array when the camera captures the image.

SUMMARY OF THE EMBODIMENTS

In a first aspect, an image sensor includes a pixel array, a first memory element, a second memory element, and an intermediate memory element. The first memory element, a second memory element, and an intermediate memory element store, respectively, a first exposure value, a second exposure value, and an intermediate exposure value between the first exposure value and the second exposure value. The pixel array includes a plurality of rectangular pixel-subarrays. Each rectangular pixel-subarray includes a rescue pixel and a first, second, and third plurality of contiguous pixels. Each of the first plurality of contiguous pixels is electrically connected to the first memory element and spans diagonally-opposite corners of the rectangular pixel-subarray in a first direction. Each of the second plurality of contiguous pixels is electrically connected to the second memory element and located on a first side of the first plurality of contiguous pixels. Each of the third plurality of contiguous pixels is electrically connected to the second memory element and located on a second side of the first plurality of contiguous pixels, opposite the first side. The rescue-pixel is electrically connected to the intermediate memory element and is at least one of (i) located on one of the first side and the second side and (ii) adjacent to one of the first plurality of contiguous pixels.

In a second aspect, an image-sensor includes a pixel array, and the first, second, third, and intermediate memory element of the first aspect. The pixel array includes a plurality of red pixels aligned beneath a red color filter, a plurality of green pixels aligned beneath a green color filter, and a plurality of blue pixels aligned beneath a blue color filter. The pixel array also includes a plurality of low-exposure pixel-subarrays, a plurality of high-exposure pixel-subarrays, a plurality of green-red side-adjacent pixel-pairs, and a plurality of green-blue side-adjacent pixel-pairs. Each of the plurality of low-exposure pixel-subarrays includes one red pixel, two green pixels, and one blue pixel in a Bayer configuration and each electrically connected to the first memory element, each one of the plurality of low-exposure pixel-subarrays is corner-adjacent to a different one of the plurality of low-exposure pixel-subarrays. Each of the plurality of high-exposure pixel-subarrays includes one red pixel, two green pixels, and one blue pixel in a Bayer configuration and is electrically connected to the second memory element. Each one of the plurality of high-exposure pixel-subarrays is corner-adjacent to a different one of the plurality of high-exposure pixel-subarrays. Each of the plurality of green-red side-adjacent pixel-pairs is (a) electrically connected to the intermediate memory element and (b) includes (i) a first intermediate-exposure green pixel and (ii) an intermediate-exposure red pixel that is part of a first two-by-two pixel non-Bayer subarray including a green pixel corner-adjacent to either a blue or a red pixel. Each of the plurality of green-blue side-adjacent pixel-pairs is (a) electrically connected to the intermediate memory element and (b) includes (i) a second intermediate-exposure green pixel and (ii) an intermediate-exposure blue pixel that is part of a second two-by-two pixel non-Bayer subarray including a green pixel corner-adjacent to either a blue or a red pixel.

In a third aspect, a method for capturing a high-dynamic range image comprising, for each of a plurality of rectangular pixel-subarrays of an image-sensor pixel array including a first, second, and third plurality of contiguous pixels: setting an exposure value of a rescue pixel to an intermediate exposure value between a first exposure value and a second exposure value, the rescue pixel being at least one of (i) located on one of a first side and a second side of the first plurality of contiguous pixels and (ii) adjacent to one of the first plurality of contiguous pixels, the second side being opposite the first side. Each of the first plurality of contiguous pixels is set to the first exposure value and spanning diagonally-opposite corners of the rectangular pixel-subarray in a first direction. Each of the second plurality of contiguous pixels is set to the second exposure value and located on a first side of the first plurality of contiguous pixels. Each of the third plurality of contiguous pixels is set to the second exposure value and is located on a second side.

Figure 1:
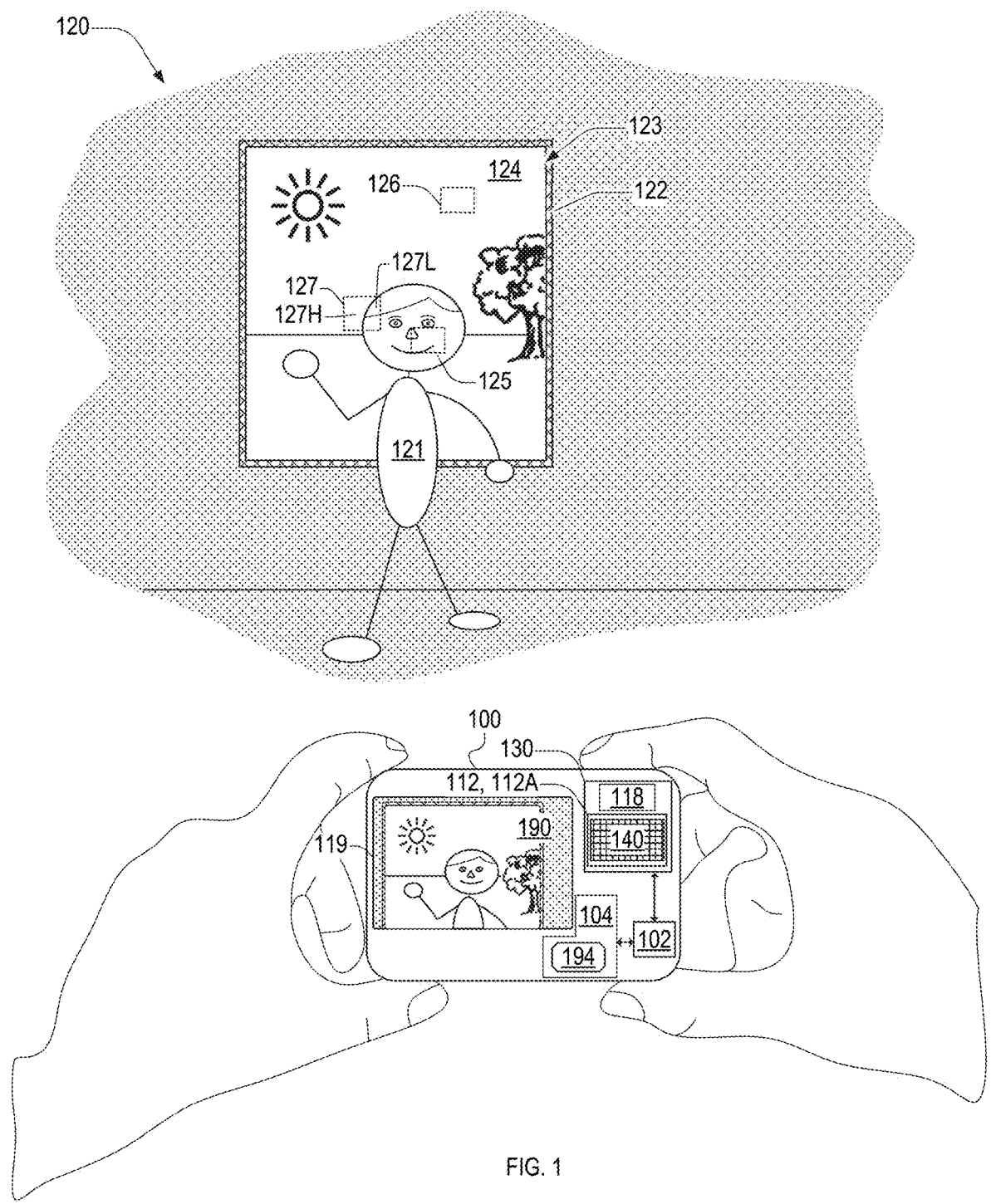
FIG. 1 depicts a scene being imaged by a camera that includes an image sensor having a pixel array, according to an embodiment.

Each of FIGS. 6-19 is a schematic plan view of a pixel-array region of the image sensor of FIG. 1, in embodiments.

Figure 19:
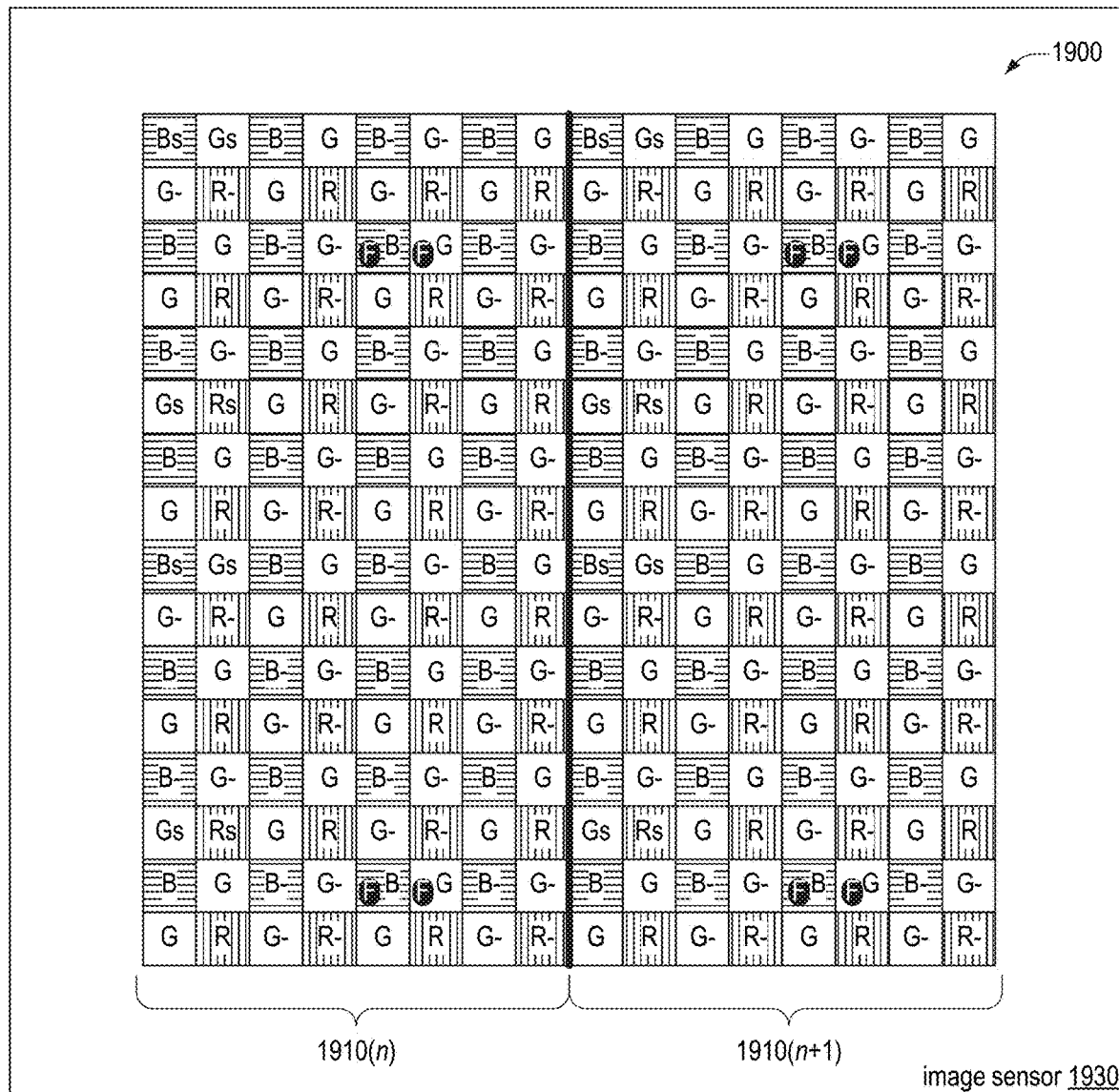
Figure 20:
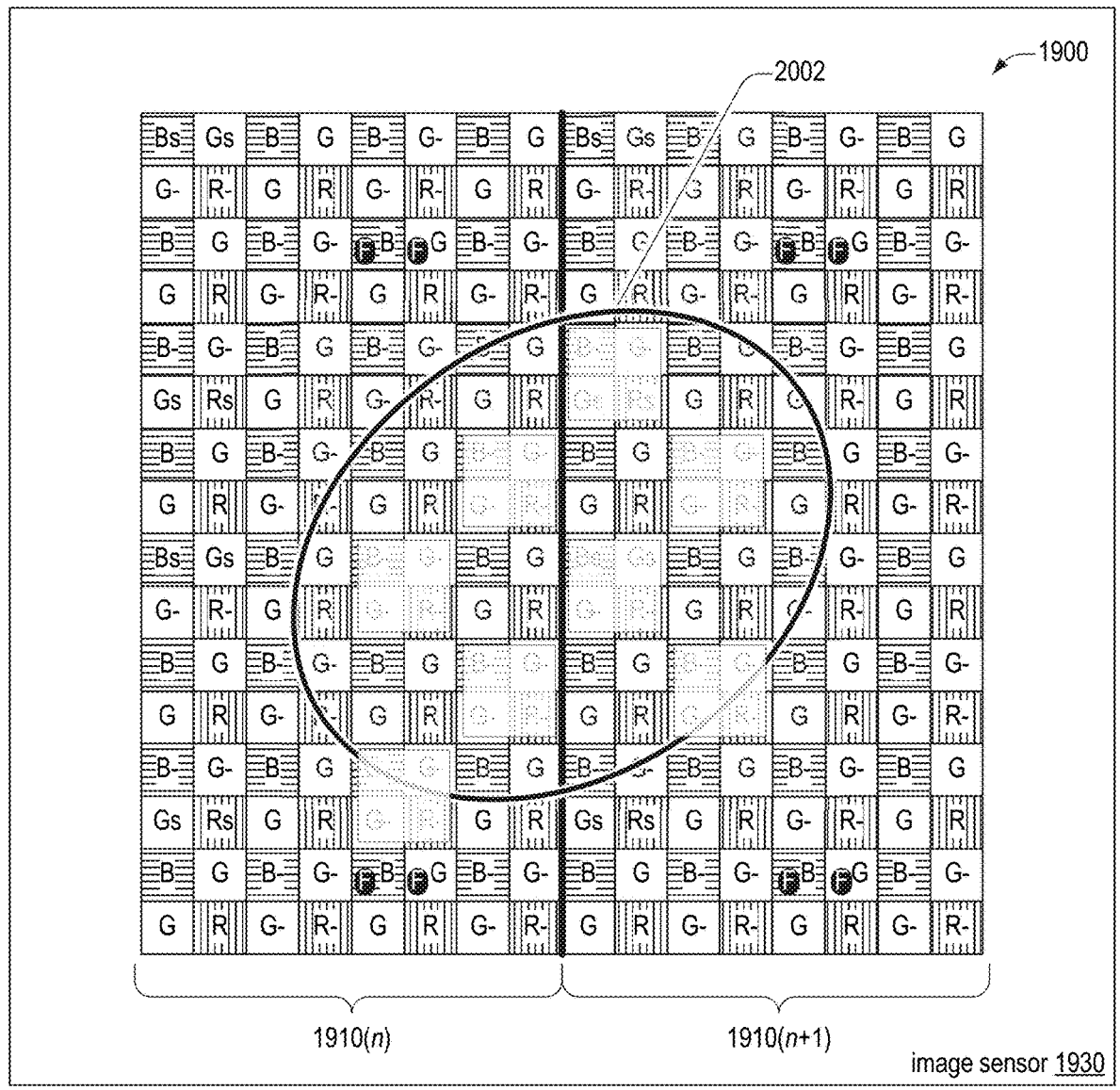

FIG. 20 is a schematic plan view of the pixel-array region of FIG. 19 when a poorly-illuminated object is imaged thereon, in an embodiment.

Figure 21:
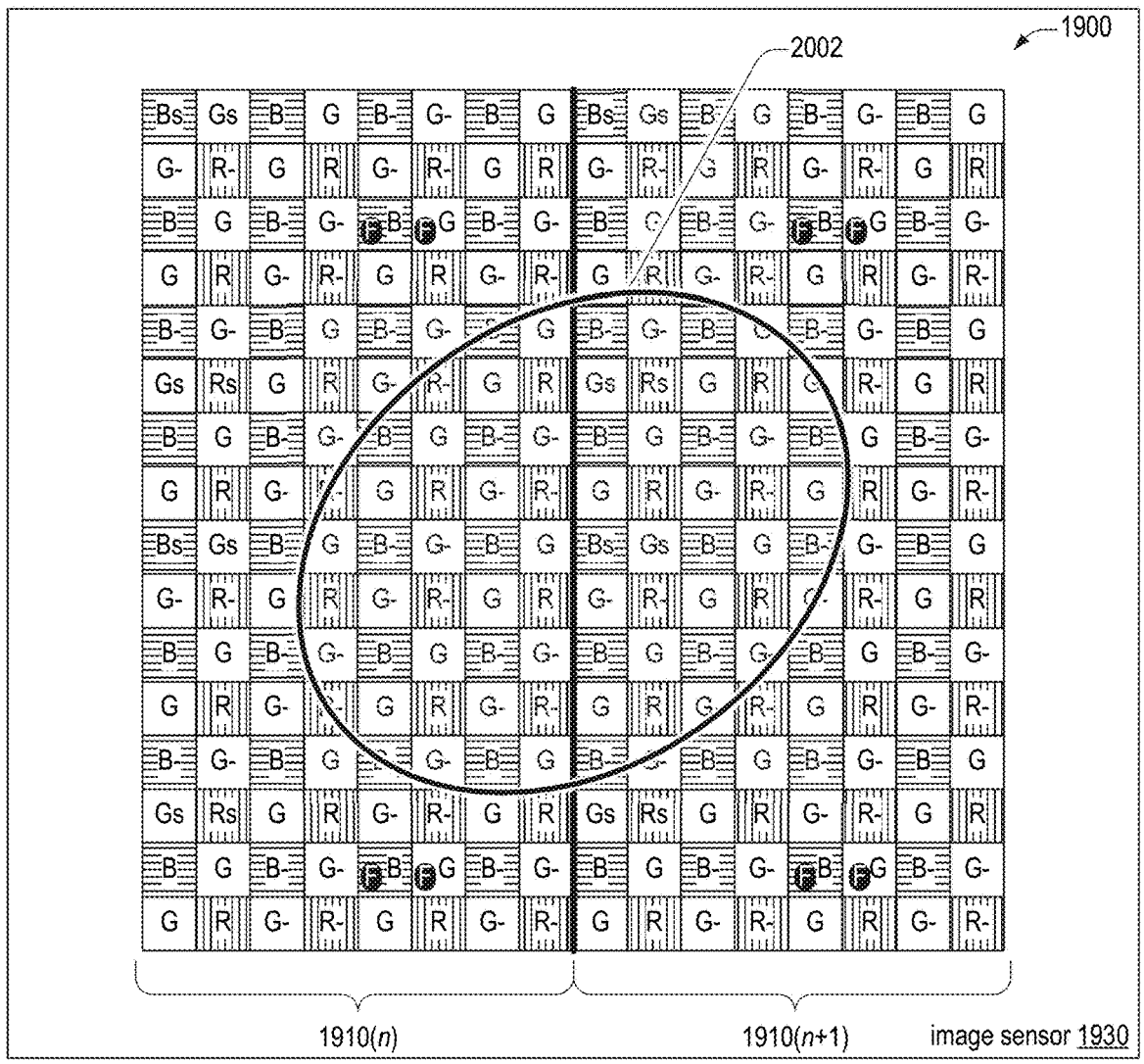

FIG. 21 is a schematic illustration of an image recovery method that is enabled by use of three sets of exposures within the pixel-array region of FIG. 19.

Figure 22:
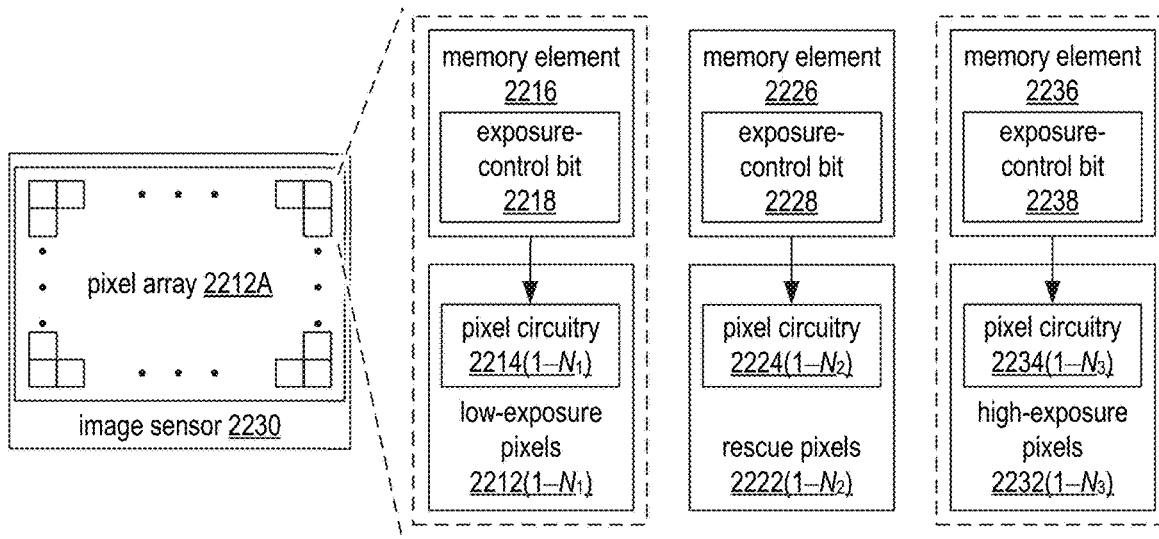

FIG. 22 is a schematic of a pixel array, which includes a plurality of rescue pixels electrically connected to a common memory element, in an embodiment.

Figure 23:
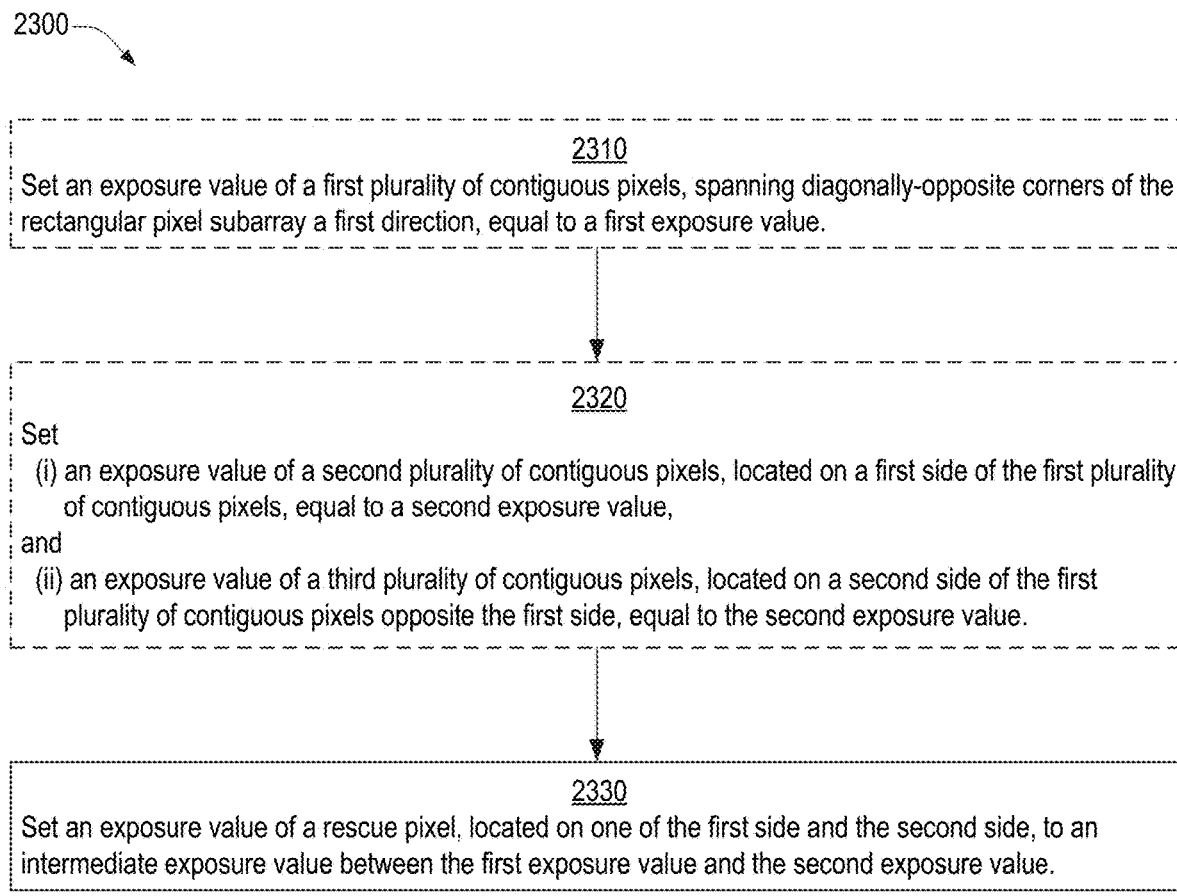

FIG. 23 is a flowchart illustrating a method for capturing a high-dynamic-range image, in an embodiment.

DETAILED DESCRIPTION OF THE EMBODIMENTS

FIG. 1 depicts a camera 100 imaging a scene 120 that has a high dynamic range of luminance. Scene 120 includes a person 121 in front of a window 122, through which a sunny scene 123 is visible. Scene 120 includes a sky 124 and scene regions 125, 126, and 127. Scene regions 125 and 126 are entirely occupied by person 121 and sky 124, respectively. Scene region 127 includes part of sky 124 and part of person 121.

Camera 100 includes an imaging lens (not shown), an image sensor 130, a memory 104, and a processor 102 communicatively coupled to image sensor 130. Image sensor 130 includes a pixel array 112A, which may have a color filter array (CFA) 140 thereon. Pixel array 112A includes a plurality of pixels 112, not shown in FIG. 1 for clarity of illustration. Each color filter of CFA 140 may be aligned with a respective pixel 112 of pixel array 112A or with a center of a respective pixel-subarray of pixel array 112A. A pixel-subarray is, for example, an m×n array of pixels 112, where m and n are integers, at least one of which is greater than one. The imaging lens of camera 100 images scene 120 onto image sensor 130. Image sensor 130 also includes circuitry 118 that includes at least one analog-to-digital converter. Camera 100 may also include a motion sensor 86, which may include at least one accelerometer.

Each pixel 112 generates a pixel charge corresponding to a respective intensity of light from a scene 120 imaged onto pixel array 112A. Circuitry 118 converts each pixel charge to a respective one of a first plurality of pixel-values 194 of an image 190. Pixel-values 194 may be stored in memory 104. Camera 100 may include a display 119 configured to display image 190. Pixel-values 194 may be stored in memory 104 in either an image file format, such as JPEG or TIFF, or a raw image format, such as TIFF/EP or Digital Negative (DNG).

In scene 120, indoor lighting, not shown, illuminates the front of person 121 facing the camera while sunlight illuminates sunny scene 123. Hence, person 121 and sunny scene 123 have respective differing luminosities. Since the direct sunlight is typically significantly brighter than the indoor lighting, luminosity of sunny scene 123 far exceeds luminosity of person 121 such that scene 120 has a high dynamic range of luminosity. Standard digital imaging enables capture of scene 120 using a single exposure value optimized for either one (but not both) of luminosity of person 121 and sunny scene 123. Even when the exposure value is optimized for luminosity of person 121, the exposure time may be too long to capture a clear image of person 121, e.g., if person 121 is moving.

The exposure value associated with an image sensor pixel may depend on at least one of the following attributes of a pixel, which may be configured independently from that of other pixels of the image sensor: analog gain and exposure duration, each of which may be set by control circuitry of the image sensor. Herein, given a first pixel set to a first exposure value and a second pixel set to a second exposure value that exceeds the first exposure value, the second pixel may be set to a second exposure duration (and/or gain) that exceeds a first exposure duration (and/or gain) associated with the first pixel.

Camera 100 may be configured to assign different exposure times to each of scene regions 125-127. The exposure time assigned to scene region 125 may exceed the exposure time assigned to scene region 126, as scene region 126 has higher luminosity. Scene region 127 includes two sub-regions 127H and 127L, which include sky 124 and person 121 respectively. The illumination of sub-region 127H is significantly higher than that of sub-region 127L. When camera 100 assigns an exposure time to scene region 127 optimized for sky 124, and hence sub-region 127H, the image of person 121 in sub-region 127L is under-exposed, and hence suffers from a low signal-to-noise ratio (SNR). When camera 100 assigns an exposure time to scene region 127 optimized for person 121, and hence sub-region 127L, the image of sky 124 in sub-region 127H is over-exposed, and hence suffers from saturation.

Figure 2:
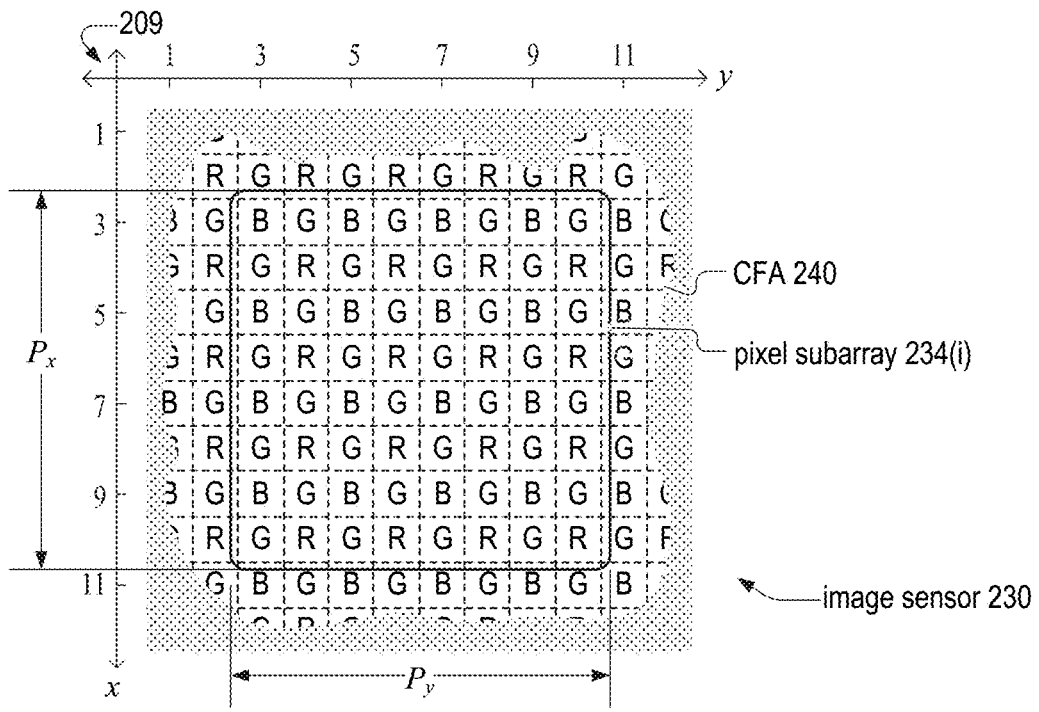
FIG. 2 is a schematic plan view of a region of an image sensor that includes the pixel array of FIG. 1, and a Bayer color filter array thereon, in an embodiment.

FIG. 2 is a schematic plan view of a region of an image sensor 230 that includes a CFA 240. While FIG. 2 illustrates CFA 240 as a Bayer color-filter array with red (R), green (G), and blue (B) color filters, CFA 240 may have red, green, and blue color filters arranged in a different pattern, and/or CFA 240 may include color filters having different respective transmission spectra. These transmission spectra may correspond to cyan, magenta, yellow, and panchromatic (e.g., white) light. Similarly, while examples of pixel-subarrays disclosed herein include red, green, and blue filters, other color filter types—such as those with any of the above transmission spectra—are also applicable to said pixel-subarrays. Image sensor 230 and CFA 240 are examples of image sensor 130 and CFA 140 respectively.

Image sensor 230 and CFA 240 are positioned with respect to an x-y coordinate system 209. Coordinates (x,y) denote locations of each color filter and pixel therebeneath, where the origin of coordinate system 209 (x=y=0) may correspond to one of many pixel locations within pixel array 112A. Herein, all coordinates are expressed as (x,y) coordinates, that is, with the x value being listed first. Also, herein, the notation $\alpha(i,j)$ refers to a color filter at coordinate (x,y)=(i,j), where $\alpha$ denotes a transmission spectrum of a color filter and i and j are integers. For example, $\alpha$ is one of r, g, b, c, m, y, and k which represent, respectively, red, green, blue, cyan, magenta, yellow, and clear (panchromatic) color filters. A subscript on a coordinate pair indicates the type color filter, of CFA 240, covering a pixel 112 located at the coordinate. For example, pixel $p(x,y)_\alpha$ denotes a pixel 112, located at coordinate (x,y), that is covered by a color filter with a transmission spectrum denoted by $\alpha$. The pixel $p(x,y)_\alpha$ generates a primary pixel-value $V_\alpha(x,y)$.

Pixel array 114A includes a plurality of pixel-subarrays 234(1, 2, . . . , S), where S is a positive integer. For example, the S pixel-subarrays 234 may be arranged in an m×n array, where m and n are positive integers, and S=m·n. Each pixel-subarray 234 has pixel dimensions $P_x \times P_y$, where integers $P_x$ and $P_y$ are each in units of pixels and may each be a power of two or a sum of two powers of two. In an embodiment, $P_y$ equals sixteen and $P_x$ equals either twenty-four or thirty-two.

Figure 3:
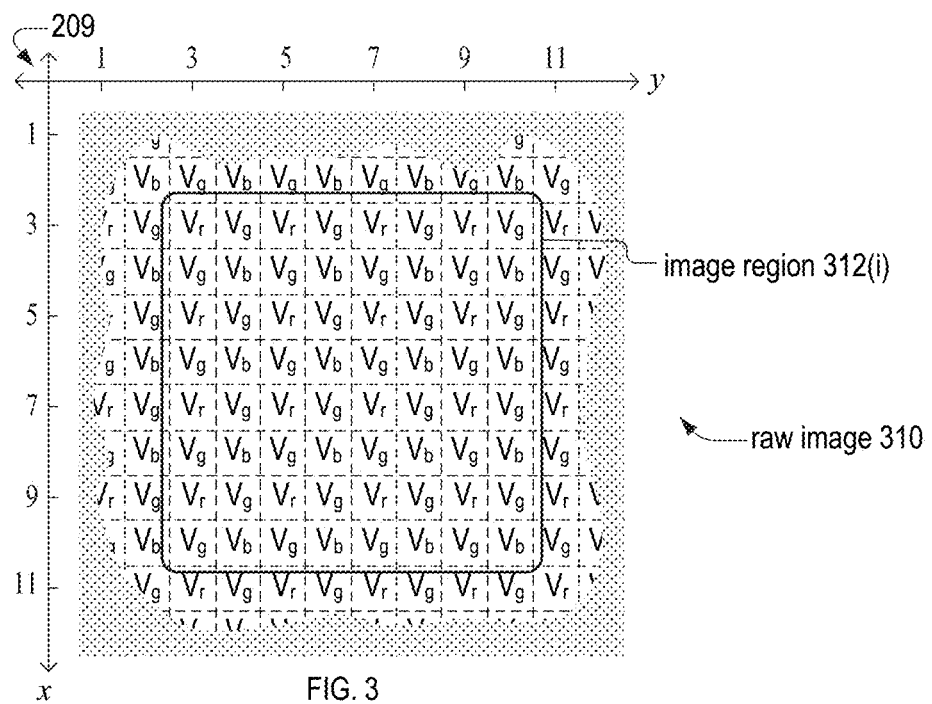
FIG. 3 is a schematic plan view of a region of a raw image corresponding to the region of the pixel array illustrated in FIG. 2.

FIG. 3 is a schematic plan view of a region of a raw image 310 corresponding to the region of pixel array 114A illustrated in FIG. 2. Raw image 310 is an example of image 190, and may include a plurality of pixel-values $V_{\alpha 1}$, a plurality of pixel-values $V_{\alpha 2}$, and a plurality of pixel-values $V_{\alpha 3}$. Each subscript $\alpha 1$, $\alpha 2$, $\alpha 3$ of pixel values V corresponds to one of transmission spectra $\alpha$ mentioned above. Raw image 310 may include a plurality of image regions 312(1-S), such that each image region 312(i) corresponds to a respective pixel-subarray 234(i) of pixel array 114A, where integer i satisfies 1≤i≤S. Herein, notation ($X_1$–$X_2$) following a reference numeral is shorthand for denoting the range ($X_1$, $X_1+1, \ldots X_2-1, X_2$), where $X_1$ and $X_2$ are integers.

One of image regions 312 may resemble scene region 127, FIG. 1, by including a first sub-region, characterized by a first luminosity, and a second sub-region characterized by a second luminosity that far exceeds the first luminosity. The second luminosity may exceed the first luminosity by at least a factor of two.

In the example where α1, α2, α3 are r, g, b, respectively, each primary pixel-value $V_r$ is generated by a respective pixel 112 beneath a red color filter of CFA 140, each primary pixel-value $V_g$ is generated by a respective pixel 112 beneath a green color filter of CFA 140, and each primary pixel-value $V_b$ is generated by a respective pixel 112 beneath a blue color filter of CFA 140. For example, primary pixel-values $V_r$, $V_g$, and $V_b$ at respective coordinates (3,4), (3,6), and (5,6) are generated by respective pixels of image sensor 230 at the same respective coordinates (3,4), (3,6), and (5,6). Expressed more concisely, and introducing a notational convention used herein, primary pixel-values $V_r(3,4)$, $V_b(3,6)$, and $V_g(5,6)$ are generated by respective pixels $p(3,4)_r$, $p(3,6)_g$, and $p(5,6)_b$ of image sensor 230.

Figure 4:
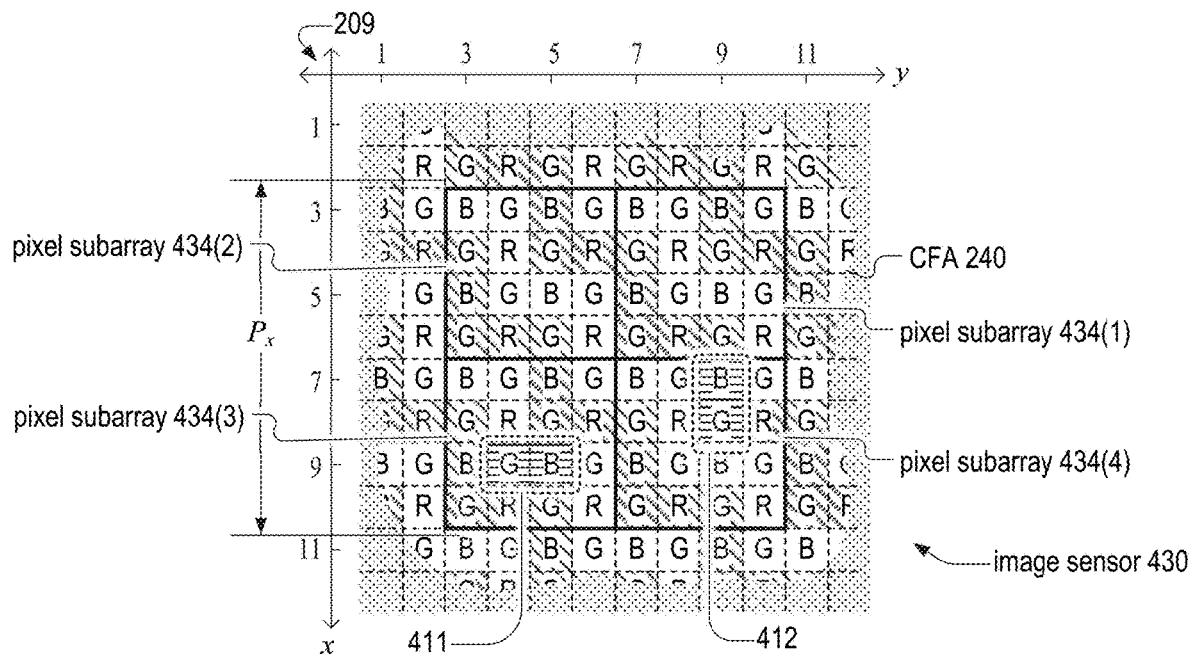
FIG. 4 is a schematic plan view of a region of an image sensor set to a first configuration of multiple exposure values, in an embodiment.

FIG. 4 is a schematic plan view of a region of an image sensor 430 that includes a plurality of pixel-subarrays 434, each of which has an equal number of short-exposure pixels and long-exposure pixels arranged in a "zig-zag" pattern that is continuous across adjacent pixel-subarrays 434. Image sensor 430 includes CFA 240 and is an example of image sensor 130, FIGS. 1 and 2. Each pixel-subarray 434 is an example of a pixel-subarray 234.

Herein, a short-exposure pixel (or low-exposure pixel) of an image sensor is a pixel set to an exposure value that is less than the exposure value of a long-exposure pixel (or high-exposure pixel) of the same image sensor. Also herein, any exposure value has a corresponding exposure time, such that when a second exposure value exceeds a first exposure value, the second exposure value may have a corresponding exposure time that exceeds a first exposure time corresponding to the first exposure value.

FIG. 4 illustrates pixel-subarrays 434(1-4). Each pixel-subarray 434 includes a four-by-four array of pixels each set to one of two exposure values, denoted in FIG. 4 by the presence ("shaded pixels") or absence ("unshaded pixels") of a diagonal hatching surrounding the color filter type designation ("R", "G", or "B") aligned above the pixel. Part or all of image sensor 430 may have an exposure-value configuration corresponding to a tiling of pixel-subarrays 434(1-4) arranged in a two-by-two array as shown in FIG. 4. Unshaded pixels may span diagonally-opposite corners of a single pixel-subarray 434, and may also span diagonally-opposite corners of two or more corner-adjacent pixel-subarrays 434, such as pixel-subarrays 434(2) and 434(4).

When capturing a first image with image sensor 430, shaded pixels and unshaded pixels of pixel-subarray 434(1) may have respective exposure values $V_a(1)$ and $V_a(2)$. In embodiments, a relative difference between exposure values $V_a(1)$ and $V_a(2)$ is at least ten percent. When capturing an HDR image with image sensor 430, FIG. 4, shaded pixels and unshaded pixels of pixel-subarray 434(1) may have respective exposure values $V_b(1)$ and $V_b(2)$. In embodiments, a relative difference between exposure values $V_b(1)$ and $V_b(2)$ is at least ten percent. In embodiments, $V_a(1) < V_a(2)$ and $V_b(1) < V_b(2)$. In other embodiments, $V_a(1) > V_a(2)$ and $V_b(1) > V_b(2)$.

In each pixel-subarray 434, the number of shaded pixels (set to exposure value $V_a(1)$) equals the number of unshaded pixels (set to exposure value $V_a(2)$). Without departing from the scope of the embodiments, the number of shaded pixels may differ from the number of unshaded pixels in a subarray 434. In an embodiment, a ratio of the number of shaded pixels to the number of unshaded pixels is between five and seven. In an embodiment, a total percentage of shaded pixels exceeds a total percentage of unshaded pixels in pixel-subarray 434 by more than fifty percentage points.

One or more pixel-subarrays 434 may include a pair of adjacent pixels set to a third exposure value, exposure value $V_a(3)$ for example. Exposure value $V_a(3)$ may be greater than exposure value $V_a(1)$ and less than exposure value $V_a(2)$, and hence is an example of an intermediate exposure value. For example, a first fraction of pixel-subarrays 434 may include a horizontally adjacent pair of pixels set to exposure value $V_a(3)$, as illustrated by horizontally-adjacent pixel-pair 411 within pixel-subarray 434(3). Similarly, a second fraction of pixel-subarrays 434 may include a vertically-adjacent pair of pixels set to exposure value $V_a(3)$, as illustrated by vertically-adjacent pixel-pair 412 within pixel-subarray 434(4). The first fraction may equal the second fraction, each of which may be between one-eighth and one-fourth. In an embodiment, the first fraction and the second fraction both equal one-sixth. Herein, pixels set to an intermediate exposure value are also referred to as "rescue-pixels."

FIG. 4 illustrates pixel-pairs 411 and 412 as decreasing the number of pixels in pixel-subarrays 434 with exposure values $V_b(2)$ (unshaded) and $V_b(1)$ (shaded), respectively. Without departing from the scope hereof, pixel-pairs 411 and 412 may be spatially shifted such that they decrease the number of pixels in pixel-subarrays 434 with exposure values $V_b(1)$ and $V_b(2)$, respectively.

In embodiments, image sensor 430 includes a plurality of pixels, each of which are both (a) set to an intermediate exposure value and (b) side-adjacent to at least one other pixel also set to the intermediate exposure value. See, for example, horizontally-adjacent pixel-pair 411, FIG. 4. Such a pairing of intermediate-exposure pixels requires less than memory (in both bits and spatial area) than when an individual isolated pixel has an exposure value differing from each of its neighboring pixels. A second benefit of pairing intermediate-exposure pixels is that when pixel sizes are sufficiently small, a single isolated pixel with an intermediate exposure value, such as exposure value $V_b(3)$, is not sufficiently large to correspond to a scene region that requires the intermediate exposure value.

When choosing pixel arrangements to assign local exposures, a number of factors are considered to render an advantageous solution. In embodiments, grouping of nearby pixels (or pixel-subarrays) to have the same exposure provides ability to provide a valid exposure based upon local scene information. Examples of nearby pixels includes adjacent pixels or interspersed pixels, such as a pair of pixels with only one to three pixels therebetween (vertically, horizontally, or diagonally, or combinations thereof). Such interspersed pixel pairs allow for interpolation of exposure values between the two pixels of each pixel pair. In the above example, a pixel-subarray may replace a pixel, such that two pixel-subarrays are nearby as described in this paragraph.

The assignment of a plurality of nearby pixels e.g., of a pixel-subarray 234 or 434, to the same exposure reduces the need for local memory to store the exposure value, e.g. exposure value 486. A reasonable balance may be achieved between smaller regions of exposure control with a need for a higher density of local exposure memory, and larger areas of local exposure control which allow the memory requirements to be more easily created in the device layout. In addition, the exact placement of pixels within a local exposure set e.g., a pixel-subarray 234 or 434, may be engineered to provide an optimum ability to interpolate image details when only this local exposure set provides best information for rendering the local scene.

In embodiments, the number of possible exposures within a local block of pixels is also optimized and/or configured in consideration of exposure control and memory requirements. A local group of pixels, e.g., of a pixel-subarray 234 or 434, is served by a local memory block and the local group of pixels sharing the memory block may be apportioned to one, two, three, or more distinct exposure values. The selection of the number of distinct exposure values may be optimized to provide flexibility to deal with edges that demark relatively bright areas and relatively dark areas. (For example, a window frame illuminated by indoor lighting where the window shows bright outdoor lighting). For static scenes, a minimum of two different exposures may apply to each local area/memory block combination.

In embodiments, the number of pixels that share a memory block's exposure assignments is also optimized based upon practical considerations of the relative size of pixels and the memory elements. The sharing of the memory block by a large set of pixels makes rendering the memory block with multiple exposure options easier to achieve. (For example, a local set of pixels sharing a common exposure memory of size forty-by-thirty). The grouping of memory block/pixel sets into smaller sets enhances the ability to optimize exposure for local changes in scene contents but would require a more advanced technology and/or a more difficult layout to render the memory and required pixel connections). For example, at least one pixel-subarray 234 may be a twelve-by-eight block of pixels with a shared memory which serves three exposure subsets within the pixels.

Figure 5:
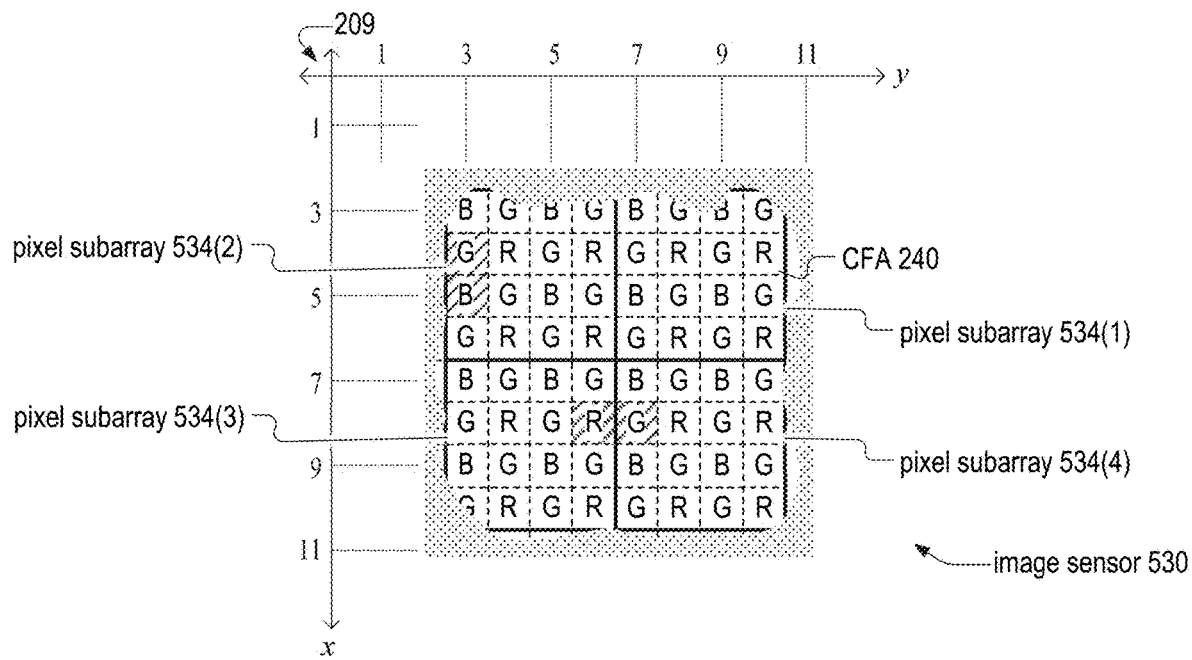
FIG. 5 is a schematic plan view of a region of an image sensor set to a second configuration of multiple exposure values, in an embodiment.

FIG. 5 is a schematic plan view of a region of an image sensor 530 that includes a plurality of pixel-subarrays 534. Image sensor 530 may include CFA 240 and is an example of image sensor 130, FIGS. 1 and 2.

Each pixel-subarray 534 has a first fraction of short-exposure pixels (shaded) and second fraction long-exposure pixels (unshaded), where the first fraction may equal one of zero, one-sixteenth or one-eighth. Each short-exposure pixel and each long-exposure pixel may have respective exposure values $V_a(1)$ and $V_a(2)$, where exposure value $V_a(2)$ exceeds exposure value $V_a(1)$. The exposure value of any pixel of a pixel-subarray 534 may be modified to change from exposure value $V_a(1)$ to $V_a(2)$ or from exposure value $V_a(2)$ to $V_a(1)$. For example, while FIG. 5 illustrates pixels at (x,y) coordinates (9,6) and (4,10) as unshaded, and hence having exposure value $V_a(2)$, the exposure value of one or both of these pixels may be changed to exposure value $V_a(1)$. In an embodiment, the color filter coordinate (4,6) is a green color filter (rather than red), and the two horizontally-adjacent pixels located at (4,6) and (4,7) may function as phase-detection auto-focus pixels and share a common microlens. Part or all of image sensor 530 may have an exposure-value configuration corresponding to a tiling of pixel-subarrays 534(1-4) oriented in a two-by-two array as shown in FIG. 5.

Each of FIGS. 6-9 depicts a schematic plan view of respective pixel-array region 600-900 of a respective image sensor 630-930. Each image sensor 630-930 is an example of image sensor 130, FIGS. 1-2. Part or all of each image sensor 630-930 may have an exposure-value configuration corresponding to a tiling of respective pixel-array region 600-900. While the pixel dimensions of each pixel-array region 600-900 is twenty-four rows by sixteen columns, any of pixel-array regions 600-900 may have different pixel dimensions without departing from the scope hereof.

Figure 6:
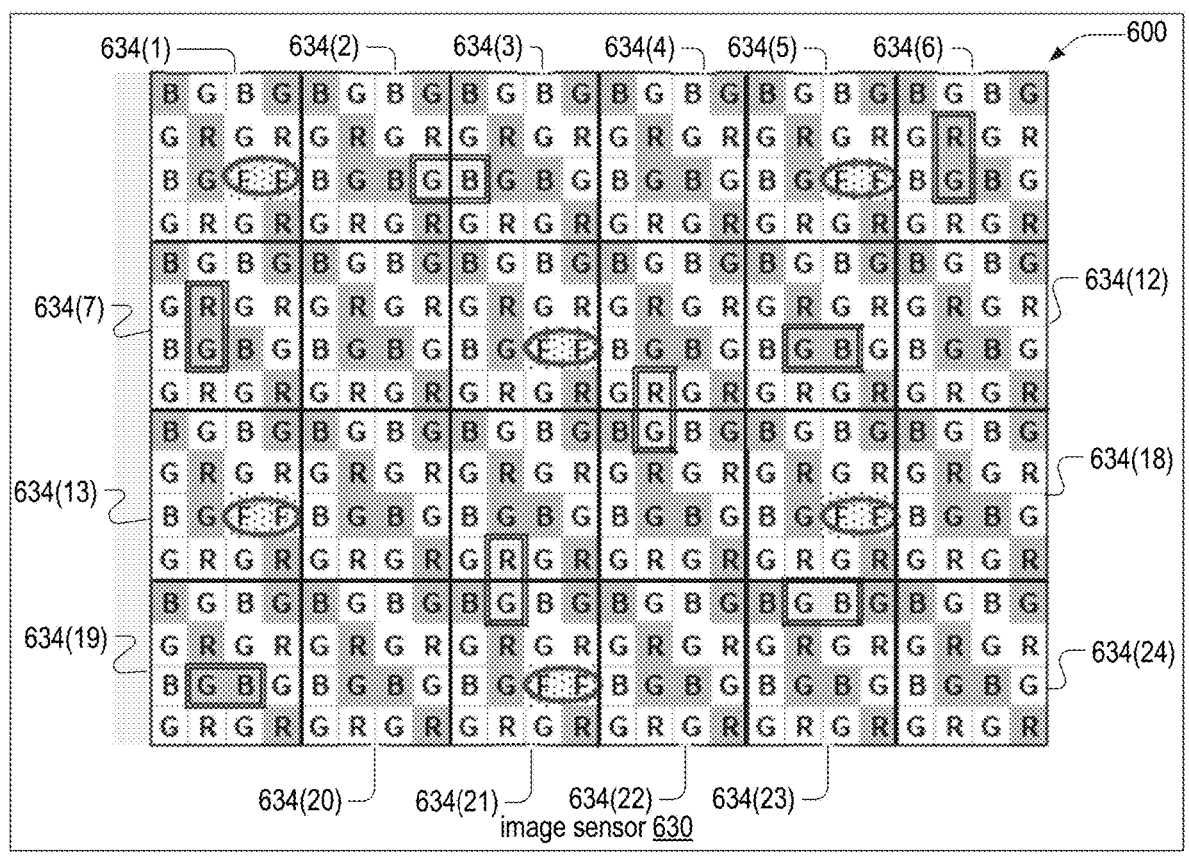

FIG. 6 is a schematic plan view of pixel-array region 600 of image sensor 630, which includes a plurality of pixel-subarrays 634(1-24). Image sensor 630 may include CFA 240. Each pixel-subarray 634 is an example of a pixel-subarray 234. For clarity of illustration, not all of pixel-subarrays are labelled in FIG. 6.

Pixel-subarrays 634 include pixel-subarrays 634(4, 6, 10, 12, 16, 18, 22, 24), hereinafter referred to individually and collectively as pixel-subarray(s) 634(A). Each pixel-subarray 634(A) includes ten long-exposure pixels (white background) and six short-exposure pixels (gray background). When all pixel-subarrays 634 are part of pixel-subarrays 634(A), pixel-subarrays 634(A) form a "zig-zag" pattern similar to that of image sensor 430. The ratio $\mathcal{R}$ of long-exposure pixels to short-exposure pixels in a pixel-subarray 634(A) may differ from $\mathcal{R}=5:3$, e.g., $\mathcal{R}=1:1$.

In the example of pixel-array region 600, remaining pixel-subarrays 634 are modifications of pixel-subarrays(A), and are referred to herein as pixel-subarrays 634(B), 634(C), and 634(D). Pixel-subarrays 634(B) include pixel-subarrays 634(1, 5, 7, 11, 15, 21), which result from replacing two horizontally adjacent pixels with a phase-difference autofocus pixel, as illustrated in FIG. 6 by a letter "F" above each of the two adjacent pixels and an ellipse representing a common oblong microlens above the two adjacent pixels. The common oblong microlens may be oblong in a plane perpendicular to its optical axis. For example, oblong microlens's aspect ratio may be between 1.75 and 2.25.

Pixel-subarrays 634(C) include pixel-subarrays 634(2, 3, 8, 13, 14, 23), which result from modifying pixel-subarray (A) such that one or two long-exposure pixels have a green-red intermediate-exposure that is between the long-exposure and the short exposure. In an example, pixel-array region 600 includes a plurality of pixel pairs (shown in FIG. 6 as being surrounded by a box with a double-line border) that are either horizontally or vertically oriented and configured to have the first intermediate exposure. Each of these pixel pairs is an example of adjacent pixel-pair 411, FIG. 4, and includes two rescue pixels.

Pixel-subarrays 634(D) include pixel-subarrays 634(6, 5, 9, 17), each of which result from modifying a pixel-subarray (A) such that one or two short-exposure pixels have a green-blue intermediate-exposure that is between the long-exposure and the short exposure.

The distribution of intermediate-exposure pixels, e.g., of pixel-subarrays 634(C, D) is relatively sparse compared to the distribution of short and long-exposure pixels. Such a sparse distribution balances a trade-off between (a) the need for intermediate-exposure pixels for handling motion artifacts and (b) maintaining sufficient resolution of the "zig-zag" exposure pattern after pixel-value interpolation, e.g., demosaicing. Additional benefits of pixel-subarrays 634 include (a) limiting color aliasing by maintaining a symmetric and well-distributed balance of color-sensing pixels (e.g., with a red, green, or blue color filter aligned thereto), while (b) providing a suitable density of focus pixels.

Figure 7:
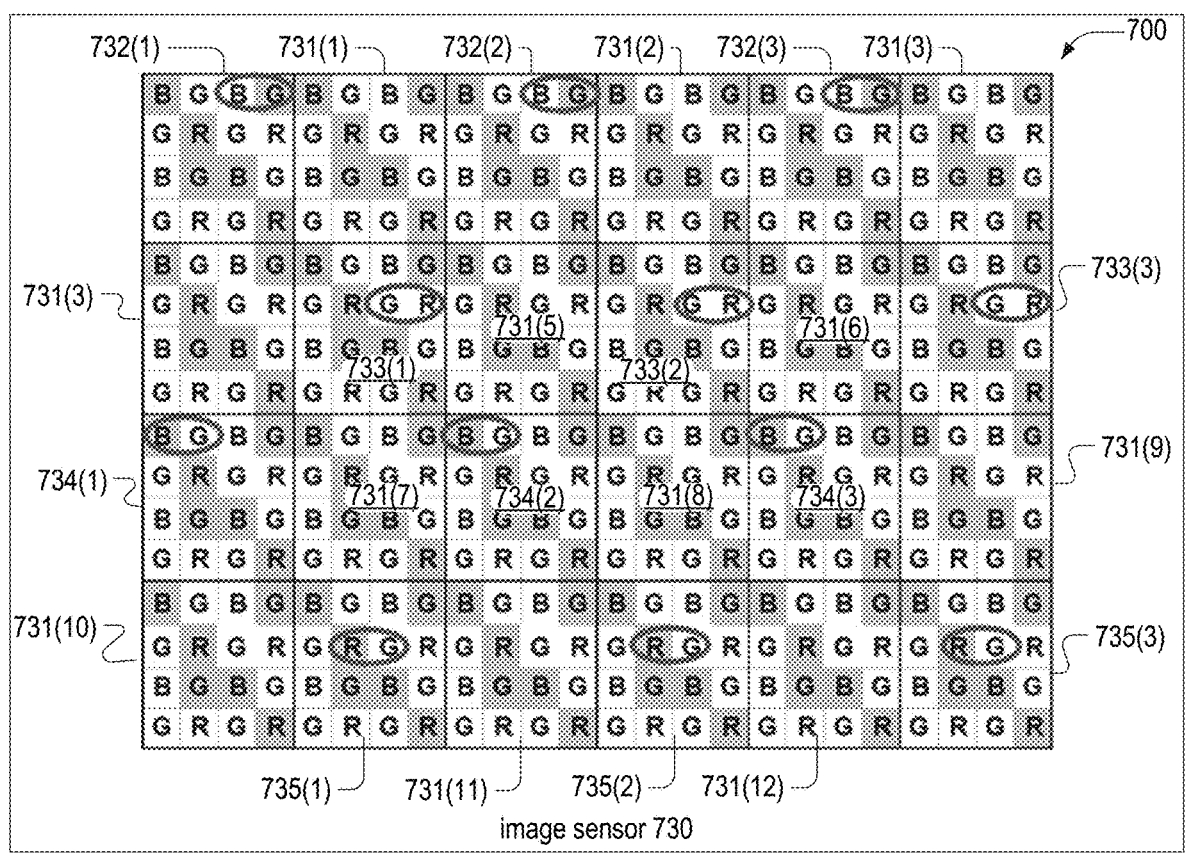

FIG. 7 is a schematic plan view of pixel-array region 700 of image sensor 730, which includes a plurality of pixel-subarrays 731(1-10), 732(1-3), 733(1-3), 734(1-3), and 735 (1-3). Image sensor 730 may include CFA 240. Each pixel-subarray 734 is an example of a pixel-subarray 234.

Each pixel-subarray 731 includes ten long-exposure pixels (white background) and six short-exposure pixels (gray background). The ratio $\mathcal{R}$ of long-exposure pixels to short-exposure pixels in a pixel-subarray 731 may differ from $\mathcal{R}$ =5:3, e.g., $\mathcal{R}$ =1:1. Each of pixel-subarrays 732-735 is a modification of pixel-subarray 731 wherein two side-adjacent pixels, enclosed by an ellipse in FIG. 7, are rescue pixels assigned an intermediate exposure value that is less than the exposure value of the long-exposure pixels and greater than the exposure of the short-exposure pixels. These differences notwithstanding, pixel-subarrays 731-735 form a "zig-zag" pattern similar to that of image sensor 430. Any of the two side-adjacent pixels with an intermediate exposure value may be either horizontally-adjacent, as illustrated in FIG. 7, or vertically side-adjacent.

In pixel-subarrays 732-735, any two side-adjacent pixels having an intermediate exposure may function as phase-difference autofocus pixels, and have common oblong microlens above each of the two adjacent pixels. The common microlens may be oblong in a plane perpendicular to its optical axis. For example, the oblong microlens's aspect ratio may be between 1.75 and 2.25. The two horizontally adjacent pixels may include both the common microlens and their respective color filters. For example, each pixel-subarray 732 may include a common oblong microlens above the upper-right pixel and the left-adjacent pixel thereto, which have a green color filter and a blue color filter, respectively. The effect of the oblong microlens has a negligible effect of the luminance of said intermediate-exposure pixels, and hence does not significantly decrease image resolution.

Figure 8:
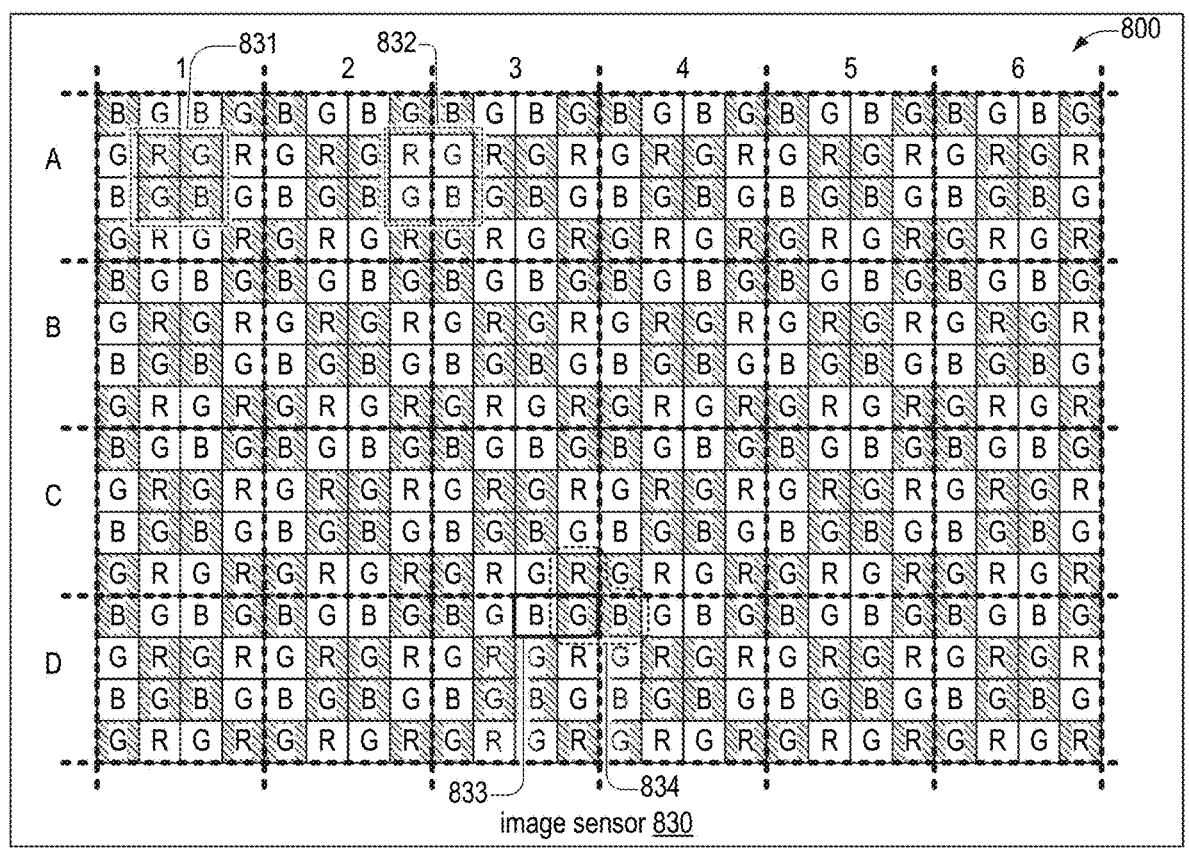

FIG. 8 is a schematic plan view of pixel-array region 800 of image sensor 830 that has CFA 240 thereon, where color filters of CFA 240 are arranged in a Bayer pattern. The exposure arrangement of image sensor 830 may be attained by modifying the exposure configuration of image sensor 730 by decreasing exposure values of selected green long-exposure pixels (white background) such that the selected green pixels are set to a short exposure time. Each of these selected green pixels is side-adjacent to a red pixel, side-adjacent to a blue pixel, and corner-adjacent (or equivalently diagonally-adjacent) to a green pixel. Herein, a red, a green, and a blue pixel refers to an image-sensor pixel aligned beneath a red, a green, and a blue color filter, respectively.

Image sensor 830 includes a first plurality of two-by-two pixel-subarrays 831 interleaved with a second plurality of two-by-two pixel-subarrays 832. FIG. 8 denotes pixel-subarrays 831 with a diagonally-hatched background and pixel-subarrays 832 with a white background. For clarity of illustration, just one of each of pixel-subarrays 831 and 832 are labelled in FIG. 8. Each pixel of a pixel-subarray 831 is configured to have a same first exposure value. Each pixel of a pixel-subarray 832 is configured to have a same second exposure value that exceeds the first exposure value.

In pixel-array region 800, the number of pixels set to the first exposure value equals the number of pixels set to the second exposure value. An advantage of the relatively basic exposure arrangement of pixel-array region 800 is to start with symmetry between long-exposure pixel sets and short-exposure pixels sets and then reassign pixels to intermediate exposure values and/or focus pixels symmetrically to have a uniform distribution of exposure values and, in embodiments, focus pixels. Such uniform distribution is important because, for common imaging applications when subsequent images are uncorrelated, it is difficult to predict what areas of the image will contain the most important information or require high or low exposure values.

Figure 9:
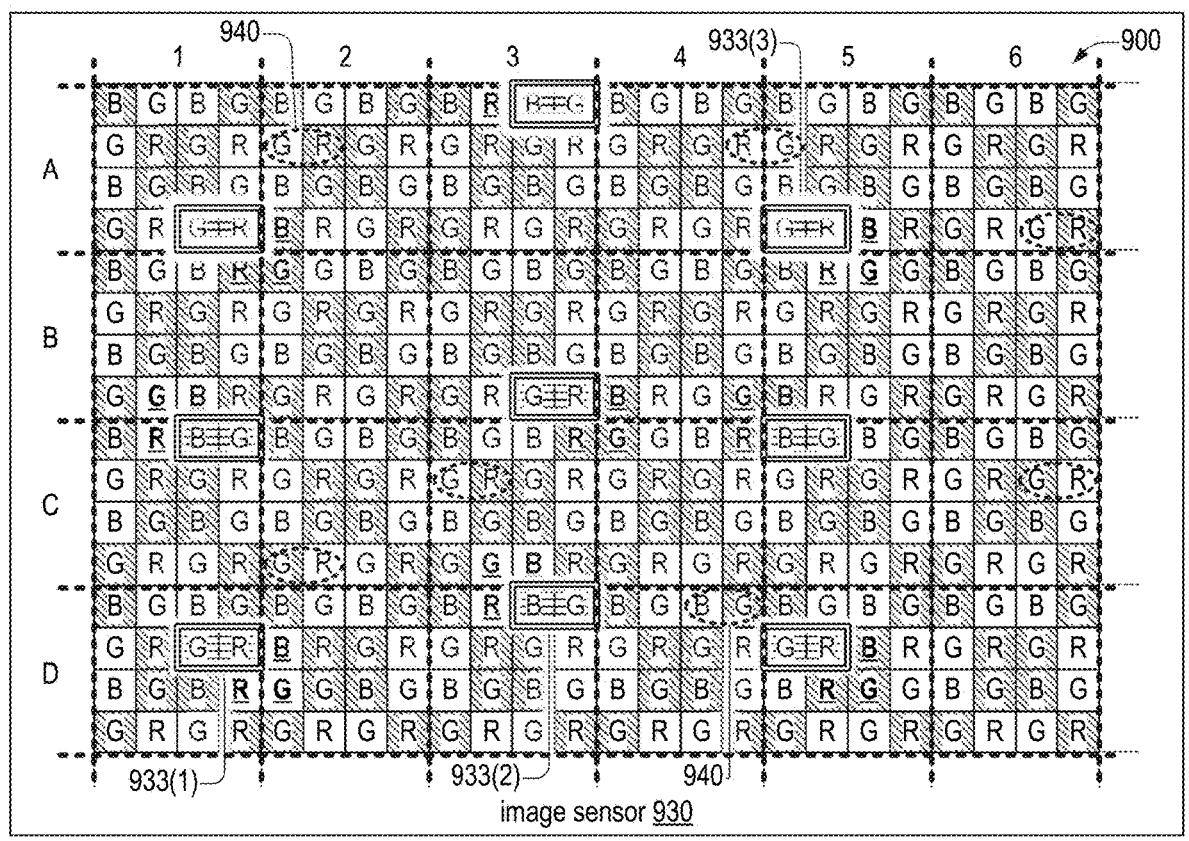

FIG. 9 is schematic plan view of pixel-array region 900 of image sensor 930. Pixel-array region 900 has an exposure configuration that is attainable by modifying the exposure configuration of image sensor 830. To facilitate description of pixel-array region 900, FIG. 9 divides pixel-array region 900 into four-by-six array of N-by-N pixel sub-regions. The four rows are denoted by letters A-D. The six columns are denoted by numerals 1-6. Pixel-array region 800 of FIG. 8 is similarly divided. While N=4 in the example of FIG. 9, N>4 in other embodiments.

Pixel-array region 900 includes a plurality of intermediate-exposure pixel-pairs 933 configured to have an intermediate exposure value, which exceeds the first exposure value of pixel-subarrays 831 and is less than the second exposure value of pixel-subarrays 831. Each intermediate-exposure pixel-pair 933 includes two side-adjacent pixels. FIG. 9 denotes intermediate-exposure pixel-pair with a horizontally-hatched background surrounded by a thick black box. For clarity of illustration, not all of intermediate-exposure pixel-pairs 933 are labelled in FIG. 9.

Assignment of the intermediate exposure value to each pixel-pair 933 eliminates an L-shaped RGB triplet of a red pixel, a green pixel, and a blue pixel, in which the green pixel is between the red and green pixels and each pixel of the arrangement has the same exposure value. For example, pixel-pair 933(2) corresponds to a pixel-pair 833 of image sensor 830, FIG. 8, which includes a blue pixel with the second exposure value (high) and a green pixel with a first exposure value (low). The green pixel of pixel-pair 833 is part of a pixel-subarray 831 that has a red pixel thereabove and a blue pixel to its right. These three pixels form an L-shaped RGB triplet 834. Every green pixel of an image sensor, such as image sensor 830, with a Bayer filter array is part of a respective L-shaped RGB triplet.

Changing the exposure values of each of the pixels of a pixel-pair 833 to the intermediate exposure value eliminates L-shaped RGB triplet 834 by changing the exposure value of the green pixel thereof. To restore an L-shaped RGB triplet adjacent to each pixel-pair 933, color filters of the three nearest-neighbor pixels to the non-green pixel of each pixel-pair 933 are changed, with respect to image sensor 830, to form a new L-shaped RGB triplet having a same exposure value equal to either the first exposure value or the second exposure value. Color filter types of these newly formed RGB triplets are denoted by bold underlined letters (R, G, B) in FIG. 9. In embodiments, restoring an L-shaped RGB triplet as described above reduces color artifacts upon demosaicing Pixel-array region 900 may also include a plurality of side-adjacent pixel pairs 940 that function as phase-difference autofocus pixels and have a common oblong microlens thereabove, as described in the description FIG. 6. In FIG. 9, such pixel pairs are denoted by an ellipse thereon representing the microlens, and may be set to the same intermediate exposure value of pixel-pairs 933. Color filter types adjacent to each side-adjacent pixel pairs 940 may be changed to restore L-shaped RGB triplets, as discussed above regarding pixel-pairs 933. The two pixels of a side-adjacent pixel pair 940 may have different types of color filters, as illustrated in FIG. 9, or the same type of color filter.

Each of FIG. 10-16 is respective schematic plan view of a respective pixel-array region 1000-1600 that may be present in an image sensor 1030. Image sensor 1030 is an example of image sensor 130, FIGS. 1-2. In embodiments, image sensor 1030 includes one or more pixel-array regions 1000-1600. Each pixel-array region 1000-1600 includes a plurality of pixels with a high exposure value, denoted with a white background, and a plurality of pixels with a low exposure value, denoted by diagonal hatching.

Image sensor 1030 may include at least one of pixel-array region 1000-1600, which may be sparsely distributed throughout image sensor 1030. In an example sparse distribution, any pixel-array region 1000-1600 may be separated from its nearest-neighbor pixel-array region (one of regions 1000-1600) by at least six pixel-columns and at least two pixel-rows. The fraction f of pixels of image sensor 1030 belonging to any one of pixel-array regions 1000-1600 may be less than one-tenth. For example, a pixel-array region of 384 pixels (such as a 14×24 region) may include seven two-by-two pixel-array regions, each of which being one of pixel-array regions 1000-1600, such that the aforementioned fraction is f=$7/96$.

Each pixel-array region 1000-1600 includes a respective two-by-two pixel quadruplet 1010-1610, in which, instead of each pixel having a respective microlens thereabove, each pixel may be beneath a common single microlens 1012. Each region 1010-1610 may be a phase-detection autofocus region sensitive to change in both horizontal and vertical resolution. Each pixel of a pixel quadruplet 1010-1610 is set to intermediate exposure value between the aforementioned low exposure value and high exposure value. A gray background denotes the intermediate exposure value. In embodiments, image sensor 1030 includes one or more of pixel quadruplets 1010-1610.

Pixels not immediately adjacent to pixel quadruplets 1010-1610 may have a color filters thereon with transmission spectra prescribed by a Bayer color-filter array. Color filters on pixels adjacent to any of pixel quadruplets 1010-1610 may be displaced from their respective standard locations (per the Bayer pattern) for purposes of effective demosaicing. FIGS. 10-16 denote such displaced red, green, and blue color filters by bold and underlined uppercase letters R, G, and B, respectively.

Figure 11:
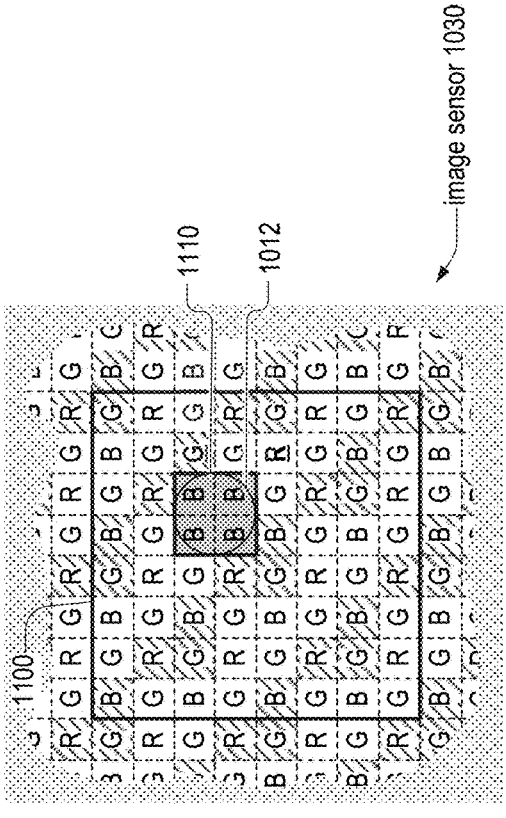
Figure 10:
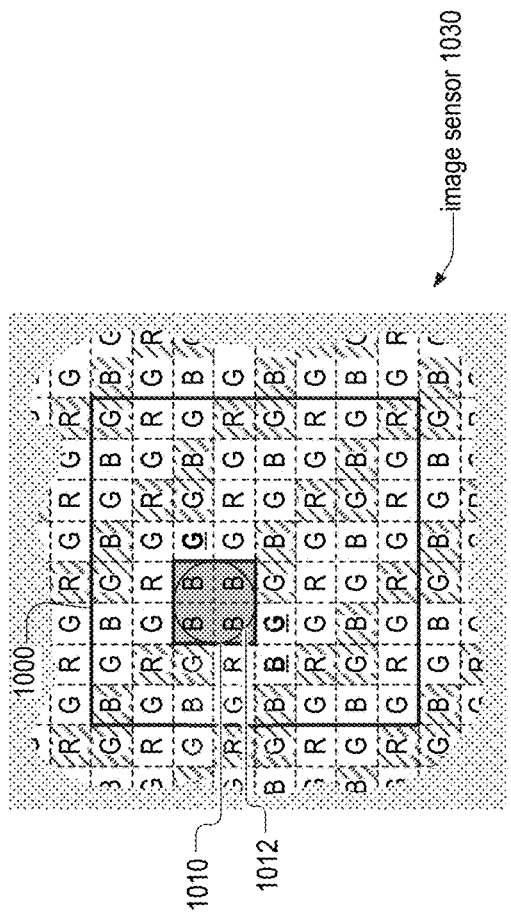

Pixel-array regions 1000 and 1100 include pixel quadruplets 1010 and 1110, respectively. Each pixel of pixel quadruplets 1010 and 1110 has a blue color filter thereon, as illustrated in FIGS. 10 and 11, respectively. In each of pixel quadruplets 1010 and 1110, the color filter of the upper-left pixel is unchanged from its original blue filter prescribed by the Bayer pattern.

Figure 13:
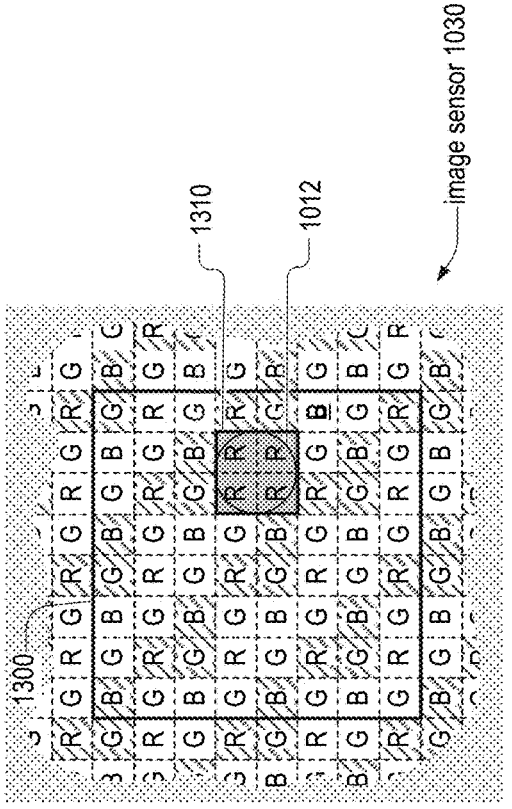
Figure 12:
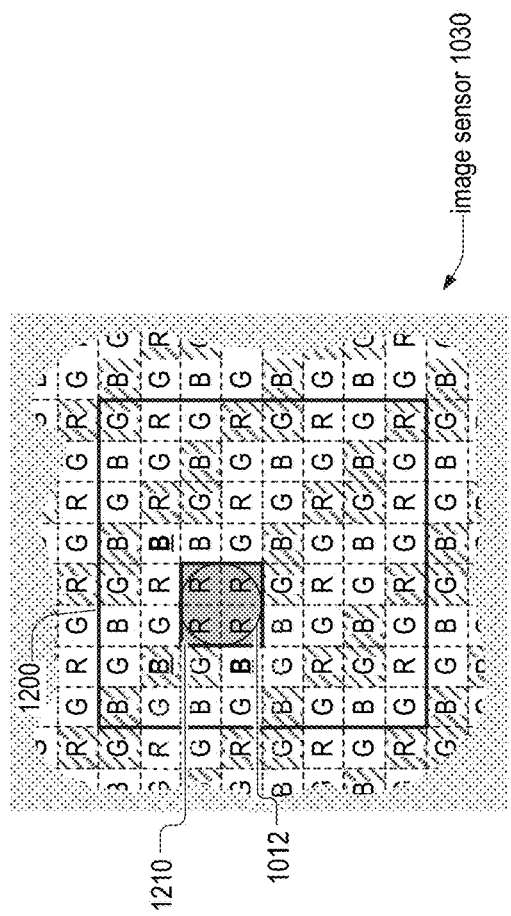
Figure 15:
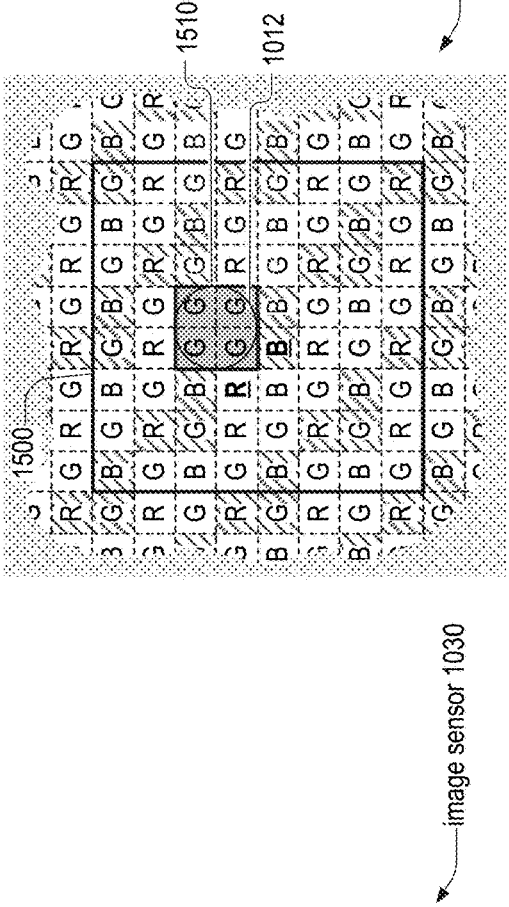
Figure 14:
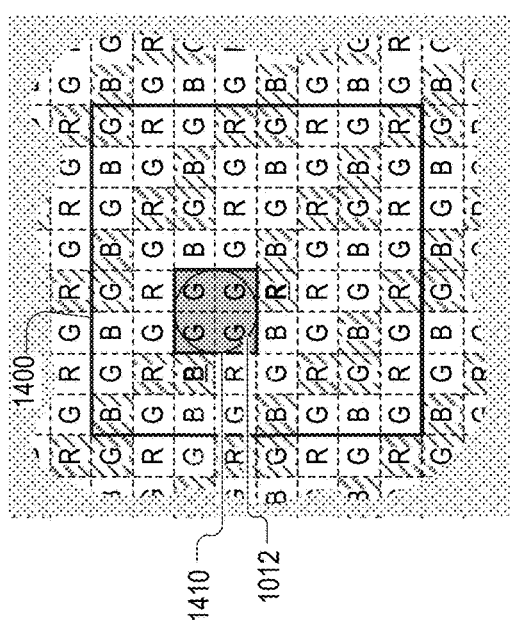
Figure 16:
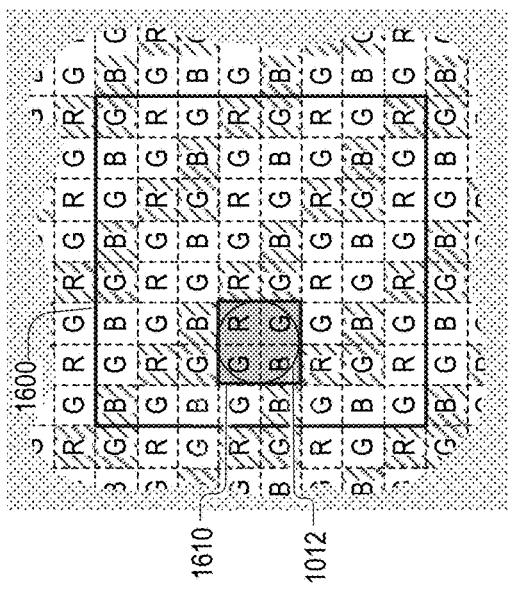

Pixel-array regions 1200 and 1300 include pixel quadruplets 1210 and 1310, respectively. Each pixel of pixel quadruplets 1210 and 1310 has a red color filter thereon, as illustrated in FIGS. 12 and 13, respectively. In each of pixel quadruplets 1210 and 1310, the color filter of the upper-left pixel is unchanged from its original red filter prescribed by the Bayer pattern.

Pixel-array regions 1400 and 1500 include pixel quadruplets 1410 and 1510, respectively. Each pixel of pixel quadruplets 1410 and 1510 has a green color filter thereon, as illustrated in FIGS. 10 and 11, respectively. In pixel quadruplet 1410, the color filters of the upper-right and lower-left pixels are unchanged from their original green filter prescribed by the Bayer pattern. In pixel quadruplet 1510, the color filters of the upper-left and lower-right pixels are unchanged from their original green filter prescribed by the Bayer pattern.

Pixels of pixel quadruplet 1610 include two corner-adjacent green pixels, a red pixel, and a blue pixel corner-adjacent thereto. In pixel quadruplet 1610, each of the four color filters are changed from their color filter types prescribed by the Bayer pattern. When pixel quadruplet 1610 includes microlens 1012, pixel quadruplet 1610 is sensitive to edges oriented along bidirectional arrow 1611, which is perpendicular to the diagonal orientation of the two diagonally-oriented green pixels of pixel quadruplet 1610.

Figure 17:
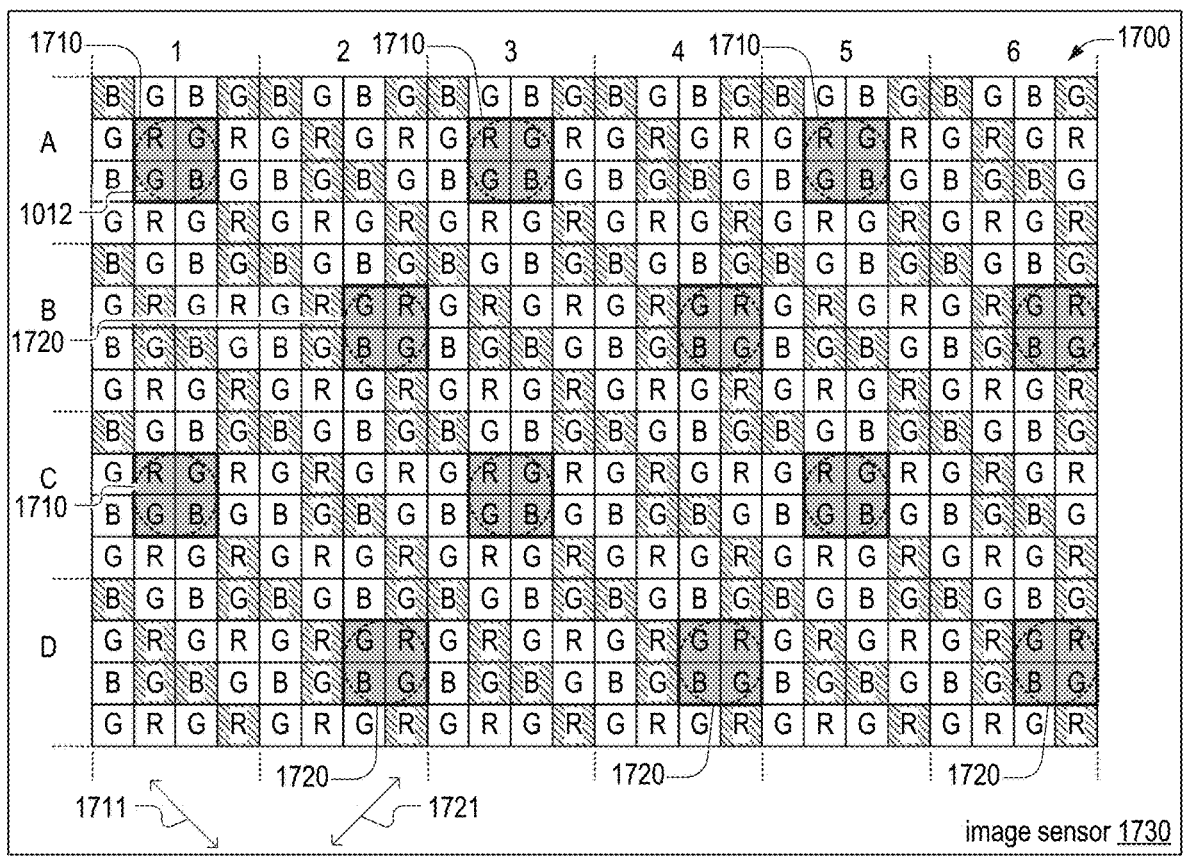

FIG. 17 is a schematic plan view of a pixel-array region 1700 of an image sensor 1730. Image sensor 1730 is an example of image sensor 130, FIGS. 1-2. Part or all of image sensor 1730 may have an exposure-value configuration corresponding to a tiling of pixel-array region 1700. Pixel-array region 1700 includes a tiling of 4×4-pixel-subarrays denoted by columns 1-6 and rows A-D. For example, row A of pixel-array region 1700 includes six 4×4-pixel-subarrays A1 through A6. Pixel-array region 1700 includes a plurality of pixels with a high exposure value, denoted with a white background, and a plurality of pixels with a low exposure value, denoted by diagonal hatching.

Pixel-array region 1700 includes a plurality of intermediate-exposure blocks 1710 and a plurality of intermediate-exposure blocks 1720. Each of pixel-subarrays A1, A3, A5, C1, C3, and C5 includes a respective intermediate-exposure block 1710. Each of pixel-subarrays B2, B4, B6, D2, D4, and D6 includes a respective intermediate-exposure block 1720. Each intermediate-exposure block 1710, 1720 may have pixel dimensions of m×m, where m≥2 is a positive integer. In the example of FIG. 17, m=2. For clarity of illustration, not all intermediate-exposure blocks are labelled in FIG. 17. In the example of FIG. 17, one-eighth of the pixels of pixel-array region 1700 are set to an intermediate exposure value.

Each pixel of intermediate-exposure blocks 1710, 1720 has an intermediate exposure value that is between the aforementioned low exposure value and high exposure value. Pixels with an intermediate exposure value are denoted by a gray background. Each pixel of a single intermediate-exposure block 1710 or 1720 may have the same exposure value; each pixel of all intermediate-exposure blocks 1710 and/or 1720 may have the same exposure value. Each intermediate-exposure block 1710 may be attained by changing (i) the exposure of the low-exposure red, green, and blue pixels thereof to the intermediate exposure value and (ii) the exposure of the high-exposure green pixel (upper right) to the intermediate exposure value. Each intermediate-exposure block 1720 may be attained by changing (i) the exposure of the two high-exposure green pixels (which are corner-adjacent) and the high-exposure red pixel thereof to the intermediate exposure value and (ii) the exposure of the low-exposure blue pixel (lower left) to the intermediate exposure value.

At least one of intermediate-exposure blocks 1710 and/or 1720 may function as a phase-detection autofocus pixel-block. As such, instead of each pixel of an intermediate-exposure block 1710 or 1720 having a respective microlens thereabove, each pixel of an intermediate-exposure block 1710, 1720 may be beneath one microlens 1012. Intermediate-exposure blocks 1710 having a single microlens 1012 are sensitive to edges oriented along bidirectional arrow 1711, which is perpendicular to the diagonal orientation of the two diagonally-oriented green pixels of each intermediate-exposure block 1710. Intermediate-exposure blocks 1720, having a single microlens 1012, are sensitive to edges oriented along bidirectional arrow 1721, which is perpendicular to the diagonal orientation of the two diagonally-oriented green pixels of each exposure block 1720. In the example of FIG. 17, one-eighth of the pixels of pixel-array region 1700 are set to an intermediate exposure value.

Figure 18:
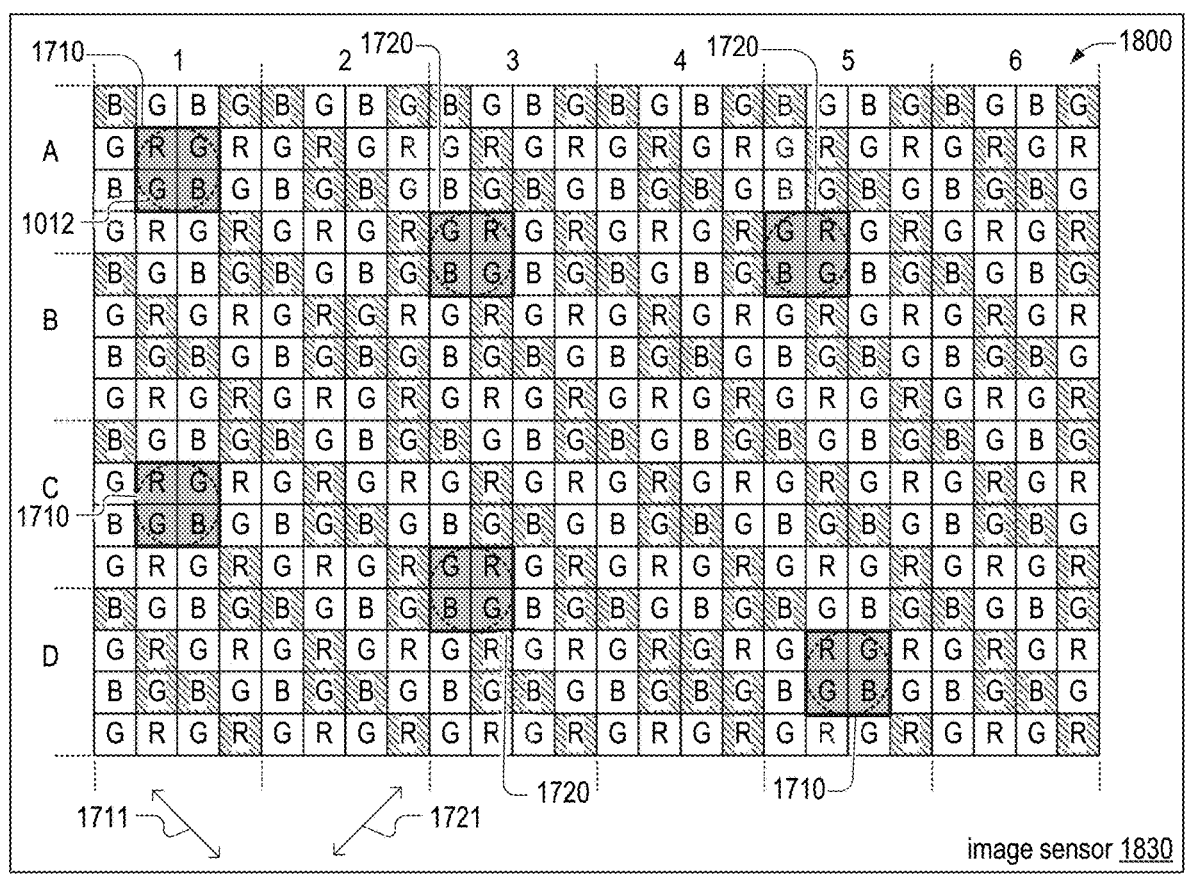

FIG. 18 is a schematic plan view of a pixel-array region 1800 of an image sensor 1830. Image sensor 1830 is an example of image sensor 130, FIGS. 1-2. Part or all of image sensor 1830 may have an exposure-value configuration corresponding to a tiling of pixel-array region 1800. Pixel-array region 1800 is similar to pixel-array region 1700, and may have a lower density of intermediate-exposure blocks 1710 and 1720 than pixel-array region 1700. In the example of FIG. 18, one-sixteenth of the pixels of pixel-array region 1800 are set to an intermediate exposure value. In pixel-array regions 1700 and 1800, the fraction of pixels with an intermediate exposure value may be equal to $$\frac{4n}{384},$$

where n is a positive integer. For example, n may range from four to sixteen.

When choosing pixel arrangements to assign local exposures, a number of factors may be considered to render an advantageous solution. In embodiments, grouping of nearby pixels to have the same exposure provides ability to provide a valid exposure based upon local scene information. Examples of nearby pixels include sets of adjacent pixels or sets of interspersed pixels.

In embodiments, the pixels are grouped in sets so that a grouping of pixels is created that can be effectively served by a common memory element to execute the exposure assignments to each subset of pixels. The subsets of pixels in the group provide the desired capability for alternate exposure levels, for example two, or three different exposures within the group. In embodiments, the subsets of pixels within the group also provide additional sets as needed for creation of color, or special purpose pixels such as pixels to aid in camera focus.

The arrangement of pixel sets within this repeating grouping may be chosen to allow a good interpolation of a scene rendering in the event that one or more of the sets of pixels with the same exposure value are a poor choice for the local scene contents. When elements in the scene move with respect to the camera due to object motion or camera motion, the light returned from the scene may change from previously captured frames. This could result in pixels with a short exposure (intended to capture a bright object at assignment) capturing too little light from a dark object. In that portion of the image, the short exposure information is noisy and the dark object is filled in using information from another exposure from set(s) of pixels with a longer exposure.

In embodiments, the arrangement of the pixels within the group is configured to provide the best interpolation of this "missing" information without artifacts or aliasing. FIG. 19 illustrates one such embodiment. FIG. 19 is a schematic plan view of a pixel-array region 1900 of an image sensor 1930. Many alternative arrangements of pixel elements and memory blocks can be designed to balance the constraints and concerns of sharing memory elements, practical layouts, costs, and image quality.

Image sensor 1930 is an example of image sensor 130, FIGS. 1-2. Pixel-array region 1900 includes a plurality of pixel-array groups 1910, such as 1910(n) and 1910(n+1) shown in FIG. 19, where n is a positive integer. In embodiments, pixel-array region 1900 has an exposure-value configuration corresponding to a tiling of pixel-array groups 1910. Each pixel-array group 1910 shares a common memory element. In the example of FIG. 19, each pixel-array group 1910 has eight columns of pixels and sixteen rows of pixels.

Each pixel of a pixel-array region is assigned to one of three exposure levels. Pixels (R, G, B) are assigned for the longest exposure as enabled by the groups shared memory elements. Pixels (Rs, Gs, Bs) are assigned for the shortest exposure a as enabled by the shared memory element. Pixels (R-, G-, B-) are assigned for an intermediate exposure value. Pixels that support camera focus, via phase-detection auto-focus process, are labeled with an uppercase "F." Locations of and/or color filters aligned to such focus pixels may differ from those in FIG. 19 without departing from the scope hereof.

FIG. 20 is a schematic plan view of pixel-array region 1900 when a poorly-illuminated object is imaged thereon in a region 2002 of pixel-array region 1900. In this example, the poorly-illuminated object is only rendered successfully using pixels of pixel-array region 1900 assigned to the longest exposure, that is, those labeled with one of R, G, and B in FIG. 20. In embodiments, camera 100 includes image sensor 1930, and camera 100 may be subject to motion and/or the dark object is moving, such that the assignment of an exact exposure in only the location of region 2002 is impractical. In this case, the above described three-exposure capability of image sensor 1930 along with a well optimized placement of the exposure pixel sets allows recovery of the image of the object.

FIG. 21 is a schematic illustration of an image recovery method that is enabled by use of three sets of exposures within pixel-array region 1900 of FIG. 19. In this method, pixels configured with short and intermediate exposure times are eliminated from the creation of the image, as their generated pixel values are too small. In FIG. 21, intermediate exposure pixels (marked with one of R-, G-, and B-) and short-exposure pixels (marked with one of Rs, Gs, and Bs) have been "blanked out" to illustrate the absence of reliable data from these underexposed locations. The arrangements of exposure values of pixel-array region 1900 is such that a relatively symmetrical set of long-exposure pixels (labeled R, G, or B) within region 2002 surround the low-exposure and intermediate-exposure pixels that are underexposed and hence generate unusable pixel values. In embodiments, pixel values corresponding to the low-exposure and intermediate-exposure pixels, are replaced or supplemented by an appropriately weighted set of nearby pixels using an algorithm to produce the best representation of the details. It should be clear to those skilled in the art that these principles apply also to supplement data that has poor signal to noise and is applicable for the case in which pixels are overexposed instead of underexposed as in this illustration.

FIG. 22 is a schematic of a pixel array 2212A of an image sensor 2230. Pixel array 2212A includes a plurality of rescue pixels 2222 electrically connected to a common memory element 2226, which is an example of aforementioned common memory elements herein. Image sensor 2230, pixel array 2212A and rescue pixels 2222(1-$N_2$) are examples of image sensor 130, pixel array 112A and pixels 112 of FIG. 1, respectively, where $N_2 \geq 2$. Examples of rescue pixels 2222 includes pixel-pairs 411 and 412 of FIG. 4, rescue pixels of FIGS. 7 and 8, intermediate-exposure pixel-pairs 933 of FIG. 9, two-by-two pixel quadruplet 1010-1610 of FIGS. 10-16, intermediate-exposure blocks 1710 and 1720 of FIGS. 17 and 18, and pixels denotes as one of (R-, G-, B-) of FIG. 19. Each rescue pixel 2222(1-$N_2$) includes respective pixel circuitry 2224(1-$N_2$), each of which is electrically connected to a same memory element 2226. Memory element 2226 stores an exposure-control bit 2228, which determines a common exposure value $V_2$ for each of rescue pixels 2222(1-$N_2$).

In embodiments, pixel array 2212A includes $N_1$ low-exposure pixels 2212(1-$N_1$). Each low-exposure pixel 2212

(1-$N_1$) includes respective pixel circuitry 2214(1-$N_1$), each of which is electrically connected to a same memory element 2216. Memory element 2216 stores an exposure-control bit 2218, which determines a common exposure value $V_1$ for each of low-exposure pixels 2212(1-$N_1$) that is less than common exposure value $V_2$ of rescue pixels 2222(1-$N_2$).

In embodiments, pixel array 2212A includes $N_3$ high-exposure pixels 2232(1-$N_3$). Each high-exposure pixel 2232 (1-$N_3$) includes respective pixel circuitry 2234(1-$N_3$), each of which is electrically connected to a same memory element 2236. Memory element 2236 stores an exposure-control bit 2238, which determines a common exposure value $V_3$ for each of high-exposure pixels 2232(1-$N_3$) that exceeds common exposure value $V_2$ of rescue pixels 2222 (1-$N_2$).

In embodiments, each of pixels 2212, 2222, and 2232 are part of a same pixel-subarray disclosed herein, such as pixel-subarray 434 (FIG. 4) or pixel-subarray 634 (FIG. 6). In embodiments, pixels 2212, 2222, and 2232 represent all the pixels in a subarray disclosed herein, such that a total number of pixels in the subarray equals ($N_1+N_2+N_3$). In embodiments, exposure value $V_2$ at least of (i) differs from common exposure value $V_1$ by at least fifty percent of common exposure value $V_1$ and (ii) differs from common exposure value $V_3$ by at least fifty percent of common exposure value $V_3$.

In embodiments, at least one of memory elements 2216, 2226, and 2236 is SRAM. In embodiments, at least one of memory elements 2216, 2226, and 2236 is part of a select circuit, such as a row-select transistor of one of pixel circuitry 2224(1, 2, . . . , $N_2$). At least one of (a) memory element 2216 may be a single memory element, (b) memory element 2226 may be a single memory element, and (c) memory element 2236 may be a single memory element. For example, when memory element 2226 is a single memory element, all rescue pixels 2222 are connected to the same single memory element: memory element 2226.

In embodiments, at least one of memory elements 2216, 2226, and 2236 includes a plurality of memory elements. For example, memory element 2226 may include M memory elements where $N_2$ is an integer multiple of M, and each of the M memory elements of memory element 226 is electrically connected to $N_2$/M rescue pixels 2222.

FIG. 23 is a flowchart illustrating a method 2300 for capturing a high-dynamic-range image. Method 2300 includes step 2330. In embodiments, method 2300 also includes at least one of steps 2310 and 2320. Method 2300 may be implemented on any of the image sensors disclosed herein, which include image sensors of FIG. 2 and FIGS. 4-19.

Method 2400 is configured for implementation on an image sensor that includes a plurality of rectangular pixel-subarrays, such as pixel-subarrays 434 of FIG. 4, each of which include a first, second, and third plurality of contiguous pixels. The first plurality of contiguous pixels spans diagonally-opposite corners of the rectangular pixel-subarray in a first direction. See, for example, the unshaded pixels of each pixel-subarray 434. Each of the second plurality of contiguous pixels are located on a first side of the first plurality of contiguous pixels. See, for example, shaded pixels on the lower-left side of unshaded pixels within a pixel-subarray 434(3). Each of the third plurality of contiguous pixels are located on a second side of the first plurality of contiguous pixels, opposite the first side. See, for example, shaded pixels on the upper-right side of unshaded pixels within pixel-subarray 434(3).

When method 2300 does not include step 2310, each of the first plurality of contiguous pixels are set to a first exposure value, for example, from an exposure configuration corresponding to a previously-captured image or a default value. Examples of the first exposure value include exposure values $V_a(2)$ and $V_b(2)$, as described in the discussion of image sensor 430. When method 2300 does not include step 2320, each of the second and third plurality of contiguous pixels are set to a second exposure value, for example, from an exposure configuration corresponding to a previously-captured image or a default value. Examples of the second exposure value include exposure values $V_a(1)$ and $V_b(1)$, also described in the discussion of image sensor 430.

Step 2330 includes setting an exposure value of a rescue pixel to intermediate exposure value between the first exposure value and the second exposure value. The rescue pixel is at least one of (i) located on one of the first side and the second side of the first plurality of contiguous pixels and (ii) adjacent to one of the first plurality of contiguous pixels. A rescue pixel may be a pixel pair, such as pixel pair 411 or pixel pair 412, FIG. 4. In a first example of step 2330, horizontally-adjacent pixel-pair 411 is set to exposure value $V_a(3)$ or $V_b(3)$. In a second example of step 2330, vertically-adjacent pixel-pair 412 is set to exposure value $V_a(3)$ or $V_b(3)$.

In embodiments, method 2300 includes step 2310, which includes setting an exposure value of each of the first plurality of contiguous pixels to the first exposure value. In an example of step 2310, unshaded pixels of each pixel-subarray 434 are set to exposure value $V_a(2)$ or $V_b(2)$.

In embodiments, method 2300 includes step 2320, which includes setting an exposure value of each of the second plurality of contiguous pixels and each the third plurality of contiguous pixels to the second exposure value. In an example of step 2320, shaded pixels of each pixel-subarray 434 are set to exposure value $V_a(1)$ or $V_b(1)$.

Combinations of Features

Features described above as well as those claimed below may be combined in various ways without departing from the scope hereof. The following enumerated examples illustrate some possible, non-limiting combinations:

(A1) An image sensor includes a pixel array, a first memory element, a second memory element, and an intermediate memory element. The first memory element, a second memory element, and an intermediate memory element store, respectively, a first exposure value, a second exposure value, and an intermediate exposure value between the first exposure value and the second exposure value. The pixel array includes a plurality of rectangular pixel-subarrays. Each rectangular pixel-subarray includes a rescue pixel and a first, second, and third plurality of contiguous pixels. Each of the first plurality of contiguous pixels is electrically connected to the first memory element and spans diagonally-opposite corners of the rectangular pixel-subarray in a first direction. Each of the second plurality of contiguous pixels is electrically connected to the second memory element and located on a first side of the first plurality of contiguous pixels. Each of the third plurality of contiguous pixels is electrically connected to the second memory element and located on a second side of the first plurality of contiguous pixels, opposite the first side. The rescue-pixel is electrically connected to the intermediate memory element and is at least one of (i) located on one of the first side and the second side and (ii) adjacent to one of the first plurality of contiguous pixels.

(A2) In image sensor (A1), a total number of rescue pixels may be between two percent and ten percent of a total number of pixels of the pixel array.

(A3) In any image sensor (A1)-(A2), a relative difference between the first exposure value and the second exposure value exceeding ten percent.

(A4) In any image sensor (A1)-(A3), the intermediate exposure value differing from the first exposure value by at least fifty percent of the first exposure value.

(A5) When (i) each rescue-pixel is one of a red pixel aligned beneath a red color filter, a green pixel aligned beneath a green color filter, and a blue pixel aligned beneath a blue color filter; and (ii) the rescue-pixel being a two-by-two quadruplet of rescue-pixels including either (a) four red pixels, (b) four green pixels, (c) four blue pixels, or (d) one red pixel, two corner-adjacent green pixels, and one blue pixel, any image sensor (A1)-(A4) may further comprise a plurality of microlenses center-aligned to a respective two-by-two quadruplet.

(A6) In any image sensor (A1)-(A5), the intermediate memory element may be a single memory element storing the intermediate exposure value, the rescue-pixel being a first pair of side-adjacent rescue-pixels each electrically connected to the single memory element.

(A7) In any image sensor (A6), the first pair of side-adjacent rescue-pixels being beneath a same microlens.

(A8) In any image sensor (A6)-(A7), the plurality of rectangular pixel-subarrays may a first rectangular pixel-subarray side-adjacent to a second rectangular pixel-subarray, the rescue-pixel of the first rectangular pixel-subarray may be side-adjacent to the rescue-pixel of the second rectangular pixel-subarray.

(A9) In any image sensor (A8), the rescue pixel of the first rectangular pixel-subarray and the rescue pixel of the second rectangular pixel-subarray may be beneath a same microlens.

(A10) In any image sensor (A1)-(A9), the first memory element may include a first plurality of memory sub-elements each storing the first exposure value; and the second memory element may include a second plurality of memory sub-elements each storing the second exposure value.

(B1) An image-sensor includes a pixel array, and the first, second, third, and intermediate memory element of image sensor (A1). The pixel array includes a plurality of red pixels aligned beneath a red color filter, a plurality of green pixels aligned beneath a green color filter, and a plurality of blue pixels aligned beneath a blue color filter. The pixel array also includes a plurality of low-exposure pixel-subarrays, a plurality of high-exposure pixel-subarrays, a plurality of green-red side-adjacent pixel-pairs, and a plurality of green-blue side-adjacent pixel-pairs. Each of the plurality of low-exposure pixel-subarrays includes one red pixel, two green pixels, and one blue pixel in a Bayer configuration and each electrically connected to the first memory element, each one of the plurality of low-exposure pixel-subarrays is corner-adjacent to a different one of the plurality of low-exposure pixel-subarrays. Each of the plurality of high-exposure pixel-subarrays includes one red pixel, two green pixels, and one blue pixel in a Bayer configuration and is electrically connected to the second memory element. Each one of the plurality of high-exposure pixel-subarrays is corner-adjacent to a different one of the plurality of high-exposure pixel-subarrays. Each of the plurality of green-red side-adjacent pixel-pairs is (a) electrically connected to the intermediate memory element and (b) includes (i) a first intermediate-exposure green pixel and (ii) an intermediate-exposure red pixel that is part of a first two-by-two pixel non-Bayer subarray including a green pixel corner-adjacent to either a blue or a red pixel. Each of the plurality of green-blue side-adjacent pixel-pairs is (a) electrically connected to the intermediate memory element and (b) includes (i) a second intermediate-exposure green pixel and (ii) an intermediate-exposure blue pixel that is part of a second two-by-two pixel non-Bayer subarray including a green pixel corner-adjacent to either a blue or a red pixel.

(B2) In image sensor (B1), the first two-by-two pixel non-Bayer subarray may include a red pixel side-adjacent to the intermediate-exposure red pixel, and the second two-by-two pixel non-Bayer subarray may include a blue pixel side-adjacent to the intermediate-exposure blue pixel.

(B3) In any image sensor (B1)-(B2), the first two-by-two pixel non-Bayer subarray may include (i) a first green pixel of the plurality of green pixels, (ii) a first blue pixel of the plurality of blue pixels, and a (iii) first red pixel of the plurality of red pixels that are, respectively, corner-adjacent, side-adjacent, and side-adjacent to the intermediate-exposure red pixel, each of the first red pixel, the first green pixel, and the first blue pixel being electrically connected to a memory element storing a same first exposure value. Also any image sensor (B1)-(B2), the second two-by-two pixel non-Bayer subarray may include (i) a first green pixel of the plurality of green pixels, (ii) a first blue pixel of the plurality of blue pixels, and a (iii) first red pixel of the plurality of red pixels that are, respectively, corner-adjacent, side-adjacent, and side-adjacent to the intermediate-exposure blue pixel, each of the first red pixel, the first green pixel, and the first blue pixel being electrically connected to a memory element storing a same second exposure value.

(B4) In any image sensor (B3), each of the first exposure value and the second exposure value may be equal to one of the low-exposure value and the high-exposure value.

(B5) In any image sensor (B1)-(B4), each of the first intermediate-exposure green pixel and the second intermediate-exposure green pixel may be part of a respective two-by-two pixel Bayer subarray.

(B6) In any image sensor (B1)-(B5), the intermediate memory element may include a plurality of single memory elements each storing the intermediate exposure value; for each of the plurality of green-red side-adjacent pixel-pairs, the first intermediate-exposure green pixel and the intermediate-exposure red pixel may be electrically connected to a same single memory element of the plurality of single memory elements; and for each of the plurality of green-blue side-adjacent pixel-pairs, the second intermediate-exposure green pixel and the intermediate-exposure blue pixel may be electrically connected to a same single memory element of the plurality of single memory elements.

(B7) In any image sensor (B1)-(B6), the first memory element may include a first plurality of memory elements each storing the first exposure value, the second memory element may include a second plurality of memory elements each storing the second exposure value.

(C1) A method for capturing a high-dynamic range image comprising, for each of a plurality of rectangular pixel-subarrays of an image-sensor pixel array including a first, second, and third plurality of contiguous pixels: setting an exposure value of a rescue pixel to an intermediate exposure value between a first exposure value and a second exposure value, the rescue pixel being at least one of (i) located on one of a first side and a second side of the first plurality of contiguous pixels and (ii) adjacent to one of the first plurality of contiguous pixels, the second side being opposite the first side. Each of the first plurality of contiguous pixels is set to the first exposure value and spanning diagonally-opposite corners of the rectangular pixel-subarray in a first direction. Each of the second plurality of contiguous pixels is set to the second exposure value and located on a first side of the first plurality of contiguous pixels. Each of the third plurality of contiguous pixels is set to the second exposure value and is located on a second side.

Method (C1) may further include setting an exposure value of each of the first plurality of contiguous pixels to the first exposure value.

Any of methods (C1) and (C2) may further include setting an exposure value of each of the second plurality of contiguous pixels and each the third plurality of contiguous pixels to the second exposure value.

Changes may be made in the above image sensors without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present image sensors, which, as a matter of language, might be said to fall therebetween.

What is claimed is:
1. An image sensor comprising:
a first memory element, a second memory element, and an intermediate memory element storing, respectively, a first exposure value, a second exposure value, and an intermediate exposure value between the first exposure value and the second exposure value, a relative difference between the first exposure value and the second exposure value exceeding ten percent; and
a pixel array including a plurality of rectangular pixel-subarrays, each including:
a first plurality of contiguous pixels each electrically connected to the first memory element and spanning diagonally-opposite corners of the rectangular pixel-subarray in a first direction,
a second plurality of contiguous pixels each electrically connected to the second memory element and located on a first side of the first plurality of contiguous pixels,
a third plurality of contiguous pixels each electrically connected to the second memory element and located on a second side of the first plurality of contiguous pixels, opposite the first side, and
a rescue-pixel electrically connected to the intermediate memory element and being at least one of (i) located on one of the first side and the second side and (ii) adjacent to one of the first plurality of contiguous pixels.

2. The image sensor of claim 1, a total number of rescue pixels being between two percent and ten percent of a total number of pixels of the pixel array.

3. The image sensor of claim 1, the intermediate exposure value differing from the first exposure value by at least fifty percent of the first exposure value.

4. The image sensor of claim 1,
each rescue-pixel being one of a red pixel aligned beneath a red color filter, a green pixel aligned beneath a green color filter, and a blue pixel aligned beneath a blue color filter;
the rescue-pixel being a two-by-two quadruplet of rescue-pixels including either (a) four red pixels, (b) four green pixels, (c) four blue pixels, or (d) one red pixel, two corner-adjacent green pixels, and one blue pixel, the image sensor further comprising:
a plurality of microlenses center-aligned to a respective two-by-two quadruplet.

5. The image sensor of claim 1, the intermediate memory element being a single memory element storing the intermediate exposure value, the rescue-pixel being a first pair of side-adjacent rescue-pixels each electrically connected to the single memory element.

6. The image sensor of claim 5, the first pair of side-adjacent rescue-pixels being beneath a same microlens.

7. The image sensor of claim 5, the plurality of rectangular pixel-subarrays including a first rectangular pixel-subarray side-adjacent to a second rectangular pixel-subarray, the rescue-pixel of the first rectangular pixel-subarray being side-adjacent to the rescue-pixel of the second rectangular pixel-subarray.

8. The image sensor of claim 7, the rescue-pixel of the first rectangular pixel-subarray and the rescue-pixel of the second rectangular pixel-subarray being beneath a same microlens.

9. The image sensor of claim 1,
the first memory element including a first plurality of memory sub-elements each storing the first exposure value; and
the second memory element including a second plurality of memory sub-elements each storing the second exposure value.

10. An image sensor comprising:
a first memory element, a second memory element, and an intermediate memory element storing, respectively, a low exposure value, a high exposure value, and an intermediate exposure value between the low exposure value and the high exposure value;
a pixel array including a plurality of red pixels aligned beneath a red color filter, a plurality of green pixels aligned beneath a green color filter, and a plurality of blue pixels aligned beneath a blue color filter;
the pixel array further including:
a plurality of low-exposure pixel-subarrays each including one red pixel, two green pixels, and one blue pixel in a Bayer configuration and each electrically connected to the first memory element, each one of the plurality of low-exposure pixel-subarrays being corner-adjacent to a different one of the plurality of low-exposure pixel-subarrays;
a plurality of high-exposure pixel-subarrays each including one red pixel, two green pixels, and one blue pixel in a Bayer configuration and each electrically connected to the second memory element, each one of the plurality of high-exposure pixel-subarrays being corner-adjacent to a different one of the plurality of high-exposure pixel-subarrays;
a plurality of green-red side-adjacent pixel-pairs each (a) electrically connected to the intermediate memory element and (b) including (i) a first intermediate-exposure green pixel and (ii) an intermediate-exposure red pixel that is part of a first two-by-two pixel non-Bayer subarray including a green pixel corner-adjacent to either a blue or a red pixel; and
a plurality of green-blue side-adjacent pixel-pairs each (a) electrically connected to the intermediate memory element and (b) including (i) a second intermediate-exposure green pixel and (ii) an intermediate-exposure blue pixel that is part of a second two-by-two pixel non-Bayer subarray including a green pixel corner-adjacent to either a blue or a red pixel.

11. The image sensor of claim 10,
the first two-by-two pixel non-Bayer subarray including a red pixel side-adjacent to the intermediate-exposure red pixel; and
the second two-by-two pixel non-Bayer sub array including a blue pixel side-adjacent to the intermediate-exposure blue pixel.

12. The image sensor of claim 10,
the first two-by-two pixel non-Bayer subarray including (i) a first green pixel of the plurality of green pixels, (ii) a first blue pixel of the plurality of blue pixels, and a (iii) first red pixel of the plurality of red pixels that are, respectively, corner-adjacent, side-adjacent, and side-adjacent to the intermediate-exposure red pixel, each of the first red pixel, the first green pixel, and the first blue pixel being electrically connected to a memory element storing a same first exposure value; and
the second two-by-two pixel non-Bayer subarray including (i) a first green pixel of the plurality of green pixels, (ii) a first blue pixel of the plurality of blue pixels, and a (iii) first red pixel of the plurality of red pixels that are, respectively, corner-adjacent, side-adjacent, and side-adjacent to the intermediate-exposure blue pixel, each of the first red pixel, the first green pixel, and the first blue pixel being electrically connected to a memory element storing a same second exposure value.

13. The image sensor of claim 12, each of the first exposure value and the second exposure value being equal to one of the value and the high exposure value.

14. The image sensor of claim 10, each of the first intermediate-exposure green pixel and the second intermediate-exposure green pixel being part of a respective two-by-two pixel Bayer subarray.

15. The image sensor of claim 10,
the intermediate memory element including a plurality of single memory elements each storing the intermediate exposure value;
for each of the plurality of green-red side-adjacent pixel-pairs, the first intermediate-exposure green pixel and the intermediate-exposure red pixel being electrically connected to a same single memory element of the plurality of single memory elements; and
for each of the plurality of green-blue side-adjacent pixel-pairs, the second intermediate-exposure green pixel and the intermediate-exposure blue pixel being electrically connected to a same single memory element of the plurality of single memory elements.

16. The image sensor of claim 10, the first memory element including a first plurality of memory elements each storing the first exposure value, the second memory element including a second plurality of memory elements each storing the second exposure value.

17. A method for capturing a high-dynamic range image comprising, for each of a plurality of rectangular pixel-subarrays of an image-sensor pixel array including a first, second, and third plurality of contiguous pixels:
setting each of the first plurality of contiguous pixels to a first exposure value;
setting each of the second plurality of contiguous pixels and each of the third plurality of contiguous pixels to a second exposure value, a relative difference between the first exposure value and the second exposure value exceeding ten percent;
setting a rescue pixel to an intermediate exposure value between the first exposure value and the second exposure value, the rescue pixel being at least one of (i) located on one of a first side and a second side of the first plurality of contiguous pixels and (ii) adjacent to one of the first plurality of contiguous pixels, the second side being opposite the first side;
the first plurality of contiguous pixels each being set to the first exposure value and spanning diagonally-opposite corners of the rectangular pixel-subarray in a first direction;
each of the second plurality of contiguous pixels being located on a first side of the first plurality of contiguous pixels; and
each of the third plurality of contiguous pixels being located on a second side.

18. An image sensor comprising:
a first memory element, a second memory element, and an intermediate memory element storing, respectively, a first exposure value, a second exposure value, and an intermediate exposure value between the first exposure value and the second exposure value; and
a pixel array including a plurality of rectangular pixel-subarrays, each including:
a first plurality of contiguous pixels each electrically connected to the first memory element and spanning diagonally-opposite corners of the rectangular pixel-subarray in a first direction,
a second plurality of contiguous pixels each electrically connected to the second memory element and located on a first side of the first plurality of contiguous pixels,
a third plurality of contiguous pixels each electrically connected to the second memory element and located on a second side of the first plurality of contiguous pixels, opposite the first side, and
a rescue-pixel electrically connected to the intermediate memory element and being at least one of (i) located on one of the first side and the second side and (ii) adjacent to one of the first plurality of contiguous pixels;
at least one of (i) a total number of rescue pixels being between two percent and ten percent of a total number of pixels of the pixel array and (ii) the intermediate exposure value differing from the first exposure value by at least fifty percent of the first exposure value.

* * * * *